(12) United States Patent
Matsukubo et al.

(10) Patent No.: US 12,487,079 B2
(45) Date of Patent: Dec. 2, 2025

(54) MEASUREMENT DEVICE AND BOARD INSPECTION DEVICE

(71) Applicant: YAMAHA HATSUDOKI KABUSHIKI KAISHA, Iwata (JP)

(72) Inventors: Takahiro Matsukubo, Iwata (JP); Takeshi Arai, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 206 days.

(21) Appl. No.: 18/555,212

(22) PCT Filed: Apr. 23, 2021

(86) PCT No.: PCT/JP2021/016516
§ 371 (c)(1),
(2) Date: Oct. 12, 2023

(87) PCT Pub. No.: WO2022/224455
PCT Pub. Date: Oct. 27, 2022

(65) Prior Publication Data
US 2024/0200934 A1    Jun. 20, 2024

(51) Int. Cl.
*G01B 11/25*  (2006.01)

(52) U.S. Cl.
CPC ...... *G01B 11/2518* (2013.01); *G01B 11/2531* (2013.01)

(58) Field of Classification Search
CPC ............... G01B 11/2518; G01B 11/2531
See application file for complete search history.

(56) References Cited

FOREIGN PATENT DOCUMENTS

| JP | H05-126545 A | 5/1993 | |
|---|---|---|---|
| JP | 2004-219154 A | 8/2004 | |
| JP | 2006030094 A * | 2/2006 | ............ G01B 11/00 |
| JP | 2010-164350 A | 7/2010 | |
| JP | 2010164377 A * | 7/2010 | ............ G01B 11/24 |
| JP | 2020-180917 A | 11/2020 | |

OTHER PUBLICATIONS

International Search Report issued in PCT/JP2021/016516; mailed Jul. 20, 2021.
Written Opinion issued in PCT/JP2021/016516; mailed Jul. 20, 2021.

(Continued)

*Primary Examiner* — Jamil Ahmed
(74) *Attorney, Agent, or Firm* — Studebaker Brackett PLLC

(57) ABSTRACT

A measurement device includes an imager, a first projector to project a linear first measurement light beam onto a measurement target from a direction inclined at a first angle, and a second projector to project a linear second measurement light beam onto the measurement target from a direction inclined at a second angle. The measurement device further includes a controller configured or programmed to remove reflected light noise based on the first measurement light beam and the second measurement light beam projected onto the measurement target and imaged by the imager and acquire height information of the measurement target.

17 Claims, 14 Drawing Sheets

(56) References Cited

OTHER PUBLICATIONS

An Office Action; "Notice of Reasons for Refusal," mailed by the Japanese Patent Office on Apr. 9, 2024, which corresponds to Japanese Patent Application No. 2023-516016 and is related to U.S. Appl. No. 18/555,212; with English language translation.

An Office Action; "Decision of Refusal," mailed by the Japanese Patent Office on Jul. 23, 2024, which corresponds to Japanese Patent Application No. 2023-516016 and is related to U.S. Appl. No. 18/555,212; with English language translation.

* cited by examiner

MEASUREMENT DEVICE AND BOARD INSPECTION DEVICE

CROSS-REFERENCE TO RELATED APPLICATION

This application is a National Stage of International Patent Application No. PCT/JP2021/016516, filed Apr. 23, 2021, the entire content of which is incorporated herein by reference.

BACKGROUND

Technical Field

The present disclosure relates to a measurement device and a board inspection device, and more particularly, it relates to a measurement device and a board inspection device, both of which measure a measurement target based on imaging of a linear measurement light beam(s).

Background Art

Conventionally, a measurement device that measures a measurement target based on imaging of a linear measurement light beam is known. Such a measurement device is disclosed in Japanese Patent Laid-Open No. 2010-164377, for example.

Japanese Patent Laid-Open No. 2010-164377 discloses a surface profile measurement system (measurement device) including an imager that images a measurement target, a line laser light source that radiates a linear measurement light beam to the measurement target, and a controller that acquires the surface profile of the measurement target based on the measurement light beam radiated to the measurement target and imaged by the imager. In the surface profile measurement system disclosed in Japanese Patent Laid-Open No. 2010-164377, the measurement light beam projected onto the same location is imaged while the focus position of the imager is changed by moving the imager in an optical axis, the focused measurement light beam is identified, and a noise light image caused by multiple reflections is removed.

SUMMARY

In the surface profile measurement system (measurement device) disclosed in Japanese Patent Laid-Open No. 2010-164377, the measurement light beam projected onto the same location is imaged while the focus position of the imager is changed by moving the imager in the optical axis, the focused measurement light beam is identified, and the noise light image (reflected light noise) caused by multiple reflections is removed. Therefore, one position on the measurement target is imaged while the imager is moved in the optical axis direction, and thus the time required to image one position on the measurement target is increased. Consequently, it takes time to measure the measurement target.

Accordingly, the present disclosure provides a measurement device and a board inspection device each capable of accurately measuring a measurement target by removing reflected light noise caused by reflection of a measurement light beam(s) while an increase in the time required to measure the measurement target is reduced or prevented.

A measurement device according to a first aspect of the present disclosure includes an imager to image a measurement target, a first projector on a first side with respect to the imager to project a linear first measurement light beam onto the measurement target from a direction inclined at a first angle with respect to a horizontal direction, and a second projector on the first side with respect to the imager to project a linear second measurement light beam onto the measurement target from a direction inclined at a second angle different from the first angle with respect to the horizontal direction. The measurement device further includes a controller configured or programmed to remove reflected light noise based on the first measurement light beam and the second measurement light beam projected onto the measurement target and imaged by the imager and acquire height information of the measurement target.

As described above, the measurement device according to the first aspect of the present disclosure includes the controller configured or programmed to remove the reflected light noise based on the first measurement light beam and the second measurement light beam projected from different inclination angles and acquire the height information of the measurement target. Accordingly, using the fact that the position of the reflected light noise derived from the first measurement light beam and the position of the reflected light noise derived from the second measurement light beam are different from each other because the first measurement light beam and the second measurement light beam projected from different inclination angles are imaged for one position on the measurement target, each reflected light noise can be removed. Thus, the measurement target can be accurately measured by removing the reflected light noise. Furthermore, unlike a case in which imaging is performed while the imager is moved in the optical axis direction, it is not necessary to perform imaging while the imager is moved in the optical axis direction at one position, and thus an increase in the imaging time at one position can be reduced or prevented. Consequently, the measurement target can be accurately measured by removing the reflected light noise caused by reflection of the measurement light beams while an increase in the time required to measure the measurement target is reduced or prevented.

In the measurement device according to the first aspect, the imager, the first projector, and the second projector are preferably operable to project and image measurement light beams while moving relative to the measurement target. Accordingly, even when a plurality of positions on the measurement target are measured while the imager, the first projector, and the second projector move relative to the measurement target, it is not necessary to perform imaging while moving the imager in the optical axis direction at each position to which the imager, the first projector, and the second projector have moved relative to the measurement target. Thus, an increase in the imaging time can be reduced or prevented, and thus an increase in the time required to measure the measurement target can be effectively reduced or prevented.

In the measurement device according to the first aspect, the controller is preferably configured or programmed to remove, as the reflected light noise, measurement light beams at positions at which a position based on the first measurement light beam and a position based on the second measurement light beam do not overlap each other. Accordingly, when the first measurement light beam and the second measurement light beam projected from different inclination angles are projected onto the same position, the first measurement light beam and the second measurement light beam are reflected to different positions due to a difference in inclination angle. Thus, while the first measurement light beam and the second measurement light beam overlap each other at the positions onto which the same are directly projected, the reflected light noise does not overlap in position. Therefore, the reflected light noise can be easily discriminated, and thus the reflected light noise can be easily removed.

In this case, the controller is preferably configured or programmed to correct the position based on the second measurement light beam by expanding or contracting a captured image such that the position based on the second measurement light beam corresponds to the position based on the first measurement light beam, based on a projection angle of the first projector and a projection angle of the second projector. Accordingly, a scale deviation caused by a difference between the inclination angles of the first measurement light beam and the second measurement light beam can be corrected by expansion or contraction, and thus the reflected light noise can be accurately removed.

In the measurement device in which the measurement light beams at the positions at which the position based on the first measurement light beam and the position based on the second measurement light beam do not overlap each other are removed as the reflected light noise, the controller is preferably configured or programmed to shift and correct, based on the first measurement light beam and the second measurement light beam projected onto a reference height position, the position based on the second measurement light beam such that the position based on the second measurement light beam corresponds to the position based on the first measurement light beam. Accordingly, a positional deviation caused by a difference between the inclination angles of the first measurement light beam and the second measurement light beam can be corrected, and thus the reflected light noise can be accurately removed.

The measurement device according to the first aspect preferably further includes a third projector on a second side opposite to the first side with respect to the imager to project a third measurement light beam onto the measurement target from a direction inclined at a third angle with respect to the horizontal direction, and a fourth projector on the second side with respect to the imager to project a fourth measurement light beam onto the measurement target from a direction inclined at a fourth angle different from the third angle with respect to the horizontal direction. The controller is preferably configured or programmed to remove the reflected light noise based on the first measurement light beam, the second measurement light beam, the third measurement light beam, and the fourth measurement light beam projected onto the measurement target and imaged by the imager, and acquire the height information of the measurement target. Accordingly, even when a shadow occurs due to the shape of the measurement target when the measurement light beam is projected from the first side with respect to the imager, the occurrence of the shadow can be reduced or prevented by projecting the measurement light beam from the second side with respect to the imager. Therefore, the occurrence of an unmeasurable portion on the measurement target can be reduced or prevented.

In this case, the controller is preferably configured or programmed to acquire a plurality of measurement heights based on the first measurement light beam, the second measurement light beam, the third measurement light beam, and the fourth measurement light beam projected onto the measurement target and imaged by the imager, and compare the acquired plurality of measurement heights to acquire one piece of height information of the measurement target. Accordingly, even when the measurement heights at one position acquired using the first measurement light beam, the second measurement light beam, the third measurement light beam, and the fourth measurement light beam are different from each other, the height information can be acquired as one measurement height, and thus the height information of the measurement target can be accurately acquired while the occurrence of an unmeasurable portion on the measurement target is reduced or prevented.

In the measurement device including the third projector and the fourth projector, the controller is preferably configured or programmed to reverse and correct positions based on the third measurement light beam and the fourth measurement light beam such that the positions based on the third measurement light beam and the fourth measurement light beam correspond to a position based on the first measurement light beam. Accordingly, the first measurement light beam, the third measurement light beam, and the fourth measurement light beam having reverse inclination angles with respect to the imager can be aligned in the same direction, and thus a process to remove the reflected light noise can be easily performed.

A board inspection device according to a second aspect of the present disclosure includes a board holder to hold a board on which an electronic component has been mounted, and a measurement unit to measure the board held by the board holder. The measurement unit includes an imager to image the board, a first projector on a first side with respect to the imager to project a linear first measurement light beam onto the board from a direction inclined at a first angle with respect to a horizontal direction, a second projector on the first side with respect to the imager to project a linear second measurement light beam onto the board from a direction inclined at a second angle different from the first angle with respect to the horizontal direction, and a controller configured or programmed to remove reflected light noise based on the first measurement light beam and the second measurement light beam projected onto the board and imaged by the imager and acquire height information of the board.

As described above, the board inspection device according to the second aspect of the present disclosure includes the controller configured or programmed to remove the reflected light noise based on the first measurement light beam and the second measurement light beam projected from different inclination angles and acquire the height information of the board. Accordingly, using the fact that the position of the reflected light noise derived from the first measurement light beam and the position of the reflected light noise derived from the second measurement light beam are different from each other because the first measurement light beam and the second measurement light beam projected from different inclination angles are imaged for one position on the board, each reflected light noise can be removed. Thus, the board can be accurately measured by removing the reflected light noise. Furthermore, unlike a case in which imaging is performed while the imager is moved in the optical axis direction, it is not necessary to perform imaging while the imager is moved in the optical axis direction at one position, and thus an increase in the imaging time at one position can be reduced or prevented. Consequently, it is possible to provide the board inspection device capable of accurately measuring the board corresponding to the measurement target by removing the reflected light noise caused by reflection of the measurement light beams while an increase in the time required to measure the board corresponding to the measurement target is reduced or prevented.

A measurement device according to a third aspect of the present disclosure includes an imager to image a measurement target, and a projector to project a measurement light beam onto the measurement target from a direction inclined with respect to a horizontal direction. The measurement device according to the third aspect further includes a controller configured or programmed to acquire a height of a position of the measurement target onto which the measurement light beam is projected, and acquire a measurement height with a higher luminance of the measurement light beam as height information of the measurement target when a plurality of measurement heights are acquired for a same position due to reflected light noise caused by reflection of the measurement light beam from the measurement target.

As described above, the measurement device according to the third aspect of the present disclosure includes the controller configured or programmed to acquire the measurement height with the higher luminance of the measurement light beam as the height information of the measurement target when the plurality of measurement heights are acquired for the same position due to reflected light noise caused by reflection of the measurement light beam from the measurement target. Accordingly, using the fact that the luminance when the measurement light beam is projected directly onto the measurement target is higher than the luminance of the reflected light noise, the measurement target can be accurately measured by eliminating the measurement height due to the reflected light noise from the plurality of measurement heights. Furthermore, unlike a case in which imaging is performed while the imager is moved in the optical axis direction, it is not necessary to perform imaging while the imager is moved in the optical axis direction at one position, and thus an increase in the imaging time at one position can be reduced or prevented. Consequently, the measurement target can be accurately measured by removing the reflected light noise caused by reflection of the measurement light beam while an increase in the time required to measure the measurement target is reduced or prevented.

In the measurement device according to the third aspect, the controller is preferably configured or programmed to acquire a height of the measurement target for all measurement light beams imaged by the imager, including the reflected light noise, and acquire the measurement height with the higher luminance of the measurement light beam as the height information of the measurement target when the plurality of measurement heights are acquired for the same position. Accordingly, the occurrence of a position on the measurement target at which the measurement height cannot be acquired can be reduced or prevented, and thus interpolation by predicting the position at which the measurement height cannot be acquired from the surrounding heights can be reduced or prevented. Consequently, the measurement target can be accurately measured.

A board inspection device according to a fourth aspect of the present disclosure includes a board holder to hold a board on which an electronic component has been mounted, and a measurement unit to measure the board held by the board holder. The measurement unit includes an imager to image the board, a projector to project a measurement light beam onto the board from a direction inclined with respect to a horizontal direction, and a controller configured or programmed to acquire a height of a position of the board onto which the measurement light beam is projected, and acquire a measurement height with a higher luminance of the measurement light beam as height information of the board when a plurality of measurement heights are acquired for a same position due to reflected light noise caused by reflection of the measurement light beam from the board.

As described above, the board inspection device according to the fourth aspect of the present disclosure includes the controller configured or programmed to acquire the measurement height with the higher luminance of the measurement light beam as the height information of the measurement target when the plurality of measurement heights are acquired for the same position due to reflected light noise caused by reflection of the measurement light beam from the board. Accordingly, using the fact that the luminance when the measurement light beam is projected directly onto the board is higher than the luminance of the reflected light noise, the board can be accurately measured by eliminating the measurement height due to the reflected light noise from the plurality of measurement heights. Furthermore, unlike a case in which imaging is performed while the imager is moved in the optical axis direction, it is not necessary to perform imaging while the imager is moved in the optical axis direction at one position, and thus an increase in the imaging time at one position can be reduced or prevented. Consequently, it is possible to provide the board inspection device capable of accurately measuring the board corresponding to the measurement target by removing the reflected light noise caused by reflection of the measurement light beam while an increase in the time required to measure the board corresponding to the measurement target is reduced or prevented.

According to the present disclosure, as described above, it is possible to accurately measure the measurement target by removing the reflected light noise caused by reflection of the measurement light beam(s) while reducing or preventing an increase in the time required to measure the measurement target.

DETAILED DESCRIPTION

Embodiments of the present disclosure are hereinafter described on the basis of the drawings.

First Embodiment

The configuration of a board inspection device 100 according to a first embodiment of the present disclosure is now described with reference to FIGS. 1 to 16.

Figure 1:
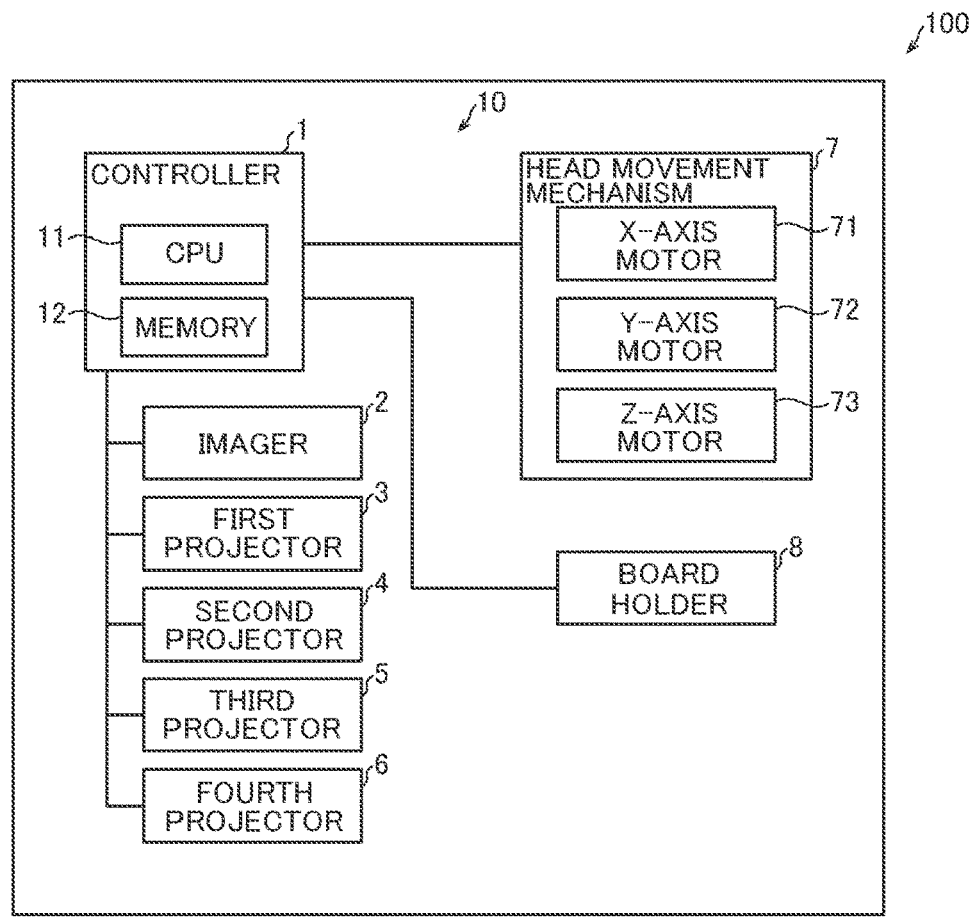
FIG. 1 is a block diagram showing a board inspection device according to a first embodiment of the present disclosure.

As shown in FIG. 1, the board inspection device 100 according to the first embodiment images a board S (see FIG. 2) as an inspection target during or after manufacturing in a board manufacturing process, and performs various inspections on the board S and electronic components C (see FIG. 2) on the board S. The board inspection device 100 is a portion of a board manufacturing line for manufacturing a circuit board by mounting the electronic components C on the board S. The board S is an example of a "measurement target" in the claims.

As an outline of the board manufacturing process, first, solder (solder paste) is printed (applied) on the board S, on which a wiring pattern is formed, in a predetermined pattern by a solder printing device (not shown) (solder printing step). Then, the electronic components C are mounted on the board S by a surface mounter (not shown) after the solder printing (mounting step) such that terminals of the electronic components C are arranged on the solder. After that, the board S on which the electronic components C have been mounted is conveyed to a reflow furnace (not shown) to melt and harden (cool) the solder (reflow step) such that the terminals of the electronic components C are soldered to wiring of the board S. Thus, the electronic components C are fixed on the board S in a state in which the electronic components C are electrically connected to the wiring, and the board manufacturing is completed.

The board inspection device 100 is used to inspect the printed state of the solder on the board S after the solder printing step, inspect the mounted states of the electronic components C after the mounting step, or inspect the mounted states of the electronic components C after the reflow step, for example. Therefore, one or more board inspection devices 100 are provided in the board manufacturing line. As the printed state of the solder, printing misalignment with respect to a design printing position, the shape, volume, and height (application amount) of the solder, the presence or absence of a bridge (short circuit), etc. are inspected. As the mounted states of the electronic components C, whether or not the types and orientations (polarities) of the electronic components C are appropriate, whether or not the amount of misalignment with respect to design mounting positions of the electronic components C is within an allowable range, whether or not the solder joint states of the terminals are normal, etc. are inspected. As common inspection contents between the steps, foreign matter such as dust and other deposits is also detected.

As shown in FIG. 1, the board inspection device 100 includes a measurement unit 10 that measures the board S. The measurement unit 10 includes a controller 1, an imager 2, a first projector 3, a second projector 4, a third projector 5, and a fourth projector 6. The board inspection device 100 also includes a head movement mechanism 7 that moves a head on which the imager 2, the first projector 3, the second projector 4, the third projector 5, and the fourth projector 6 are provided. The head movement mechanism 7 includes an X-axis motor 71, a Y-axis motor 72, and a Z-axis motor 73. The board inspection device 100 also includes a board holder 8 that holds the board S on which the electronic components C have been mounted. The measurement unit 10 is an example of a "measurement device" in the claims.

The controller 1 controls each portion of the board inspection device 100. The controller 1 includes a central processing unit (CPU) 11 that performs logical operations, and a memory 12 including a read-only memory (ROM) that stores programs for controlling the CPU 11, for example, a random access memory (RAM) that temporarily stores various data during the operation of the device, etc. The CPU 11 controls each portion of the board inspection device 100 according to the programs stored in the memory 12. The controller 1 controls the measurement unit 10 to perform various appearance inspections on the board S.

The measurement unit 10 measures a three-dimensional shape by an optical cutting method. The measurement unit 10 is moved to a predetermined position above the board S by the head movement mechanism 7, and performs imaging to inspect the appearance of the board S and the electronic components C on the board S, for example.

Figure 2:
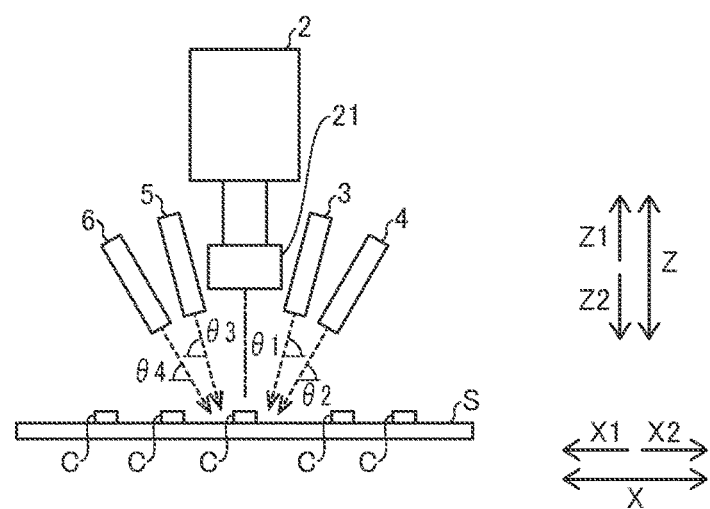
FIG. 2 is a diagram showing an imager and a projector of the board inspection device according to the first embodiment of the present disclosure.

The imager 2 images the board S as the measurement target. The imager 2 images the board S onto which linear measurement light beams have been projected by the first projector 3, the second projector 4, the third projector 5, and the fourth projector 6. The imager 2 includes an imaging device such as a CCD image sensor or a CMOS image sensor. As shown in FIG. 2, the imager 2 has an optical axis arranged along an upward-downward direction (Z direction). The imager 2 also includes an optical system 21 including lenses.

The first projector 3 is arranged on a first side (X2 direction side) with respect to the imager 2. The first projector 3 projects a linear first measurement light beam onto the board S from a direction inclined at a first angle θ1 with respect to a horizontal direction. The second projector 4 is arranged on the first side (X2 direction side) with respect to the imager 2. That is, the second projector 4 is arranged on the same side as the first projector 3 with respect to the imager 2. The second projector 4 projects a linear second measurement light beam onto the board S from a direction inclined at a second angle θ2 different from the first angle θ1 with respect to the horizontal direction. The first projection light beam and the second projection light beam are projected so as not to intersect with each other within a measurement height range.

The third projector 5 is arranged on a second side (X1 direction side) with respect to the imager 2. The third projector 5 projects a linear third measurement light beam onto the board S from a direction inclined at a third angle θ3 with respect to the horizontal direction. The fourth projector 6 is arranged on the second side (X1 direction side) with respect to the imager 2. That is, the third projector 5 and the fourth projector 6 are arranged on the same side with respect to the imager 2. The third projector 5 and the fourth projector 6 are arranged on the side of the imager 2 opposite to the first projector 3 and the second projector 4. The fourth projector 6 projects a fourth measurement light beam onto the board S from a direction inclined at a fourth angle θ4 different from the third angle θ3 with respect to the horizontal direction. The third projection light beam and the fourth projection light beam are projected so as not to intersect with each other within the measurement height range.

The imager 2, the first projector 3, the second projector 4, the third projector 5, and the fourth projector 6 project the measurement light beams and capture images while moving relative to the board S. That is, images are captured while the measurement light beams are scanned over the board S, and the three-dimensional shape (height information) of the board S is measured.

The head movement mechanism 7 is provided above the board holder 8, and includes an orthogonal three-axis (XYZ-axis) robot using ball screw axes and servomotors, for example. The head movement mechanism 7 includes the X-axis motor 71, the Y-axis motor 72, and the Z-axis motor 73 for X-axis, Y-axis, and Z-axis driving. The head movement mechanism 7 can move the head on which the imager 2, the first projector 3, the second projector 4, the third projector 5, and the fourth projector 6 are provided in X and Y directions (horizontal direction) and the Z direction (upward-downward direction) above the board holder 8 (board S) with these X-axis motor 71, Y-axis motor 72, and Z-axis motor 73.

The board holder 8 holds the board S on which the electronic components C have been mounted. Furthermore, the board holder 8 can convey the board S in the horizontal direction, and stop and hold the board S at a predetermined inspection position. Moreover, the board holder 8 can convey the board 110 that has been inspected in the horizontal direction from the predetermined inspection position and carry the board S out of the board inspection device 100.

The controller 1 acquires the three-dimensional shape (height information) of the board S based on the linear measurement light beams projected onto the board S. Specifically, as shown in FIGS. 3 to 5, the controller 1 moves the imager 2, the first projector 3, the second projector 4, the third projector 5, and the fourth projector 6 relative to the board S in a predetermined direction (X direction) at a speed v, and acquires the height information from the temporal maximum luminance position at a measurement position on the board S.

Figure 3:
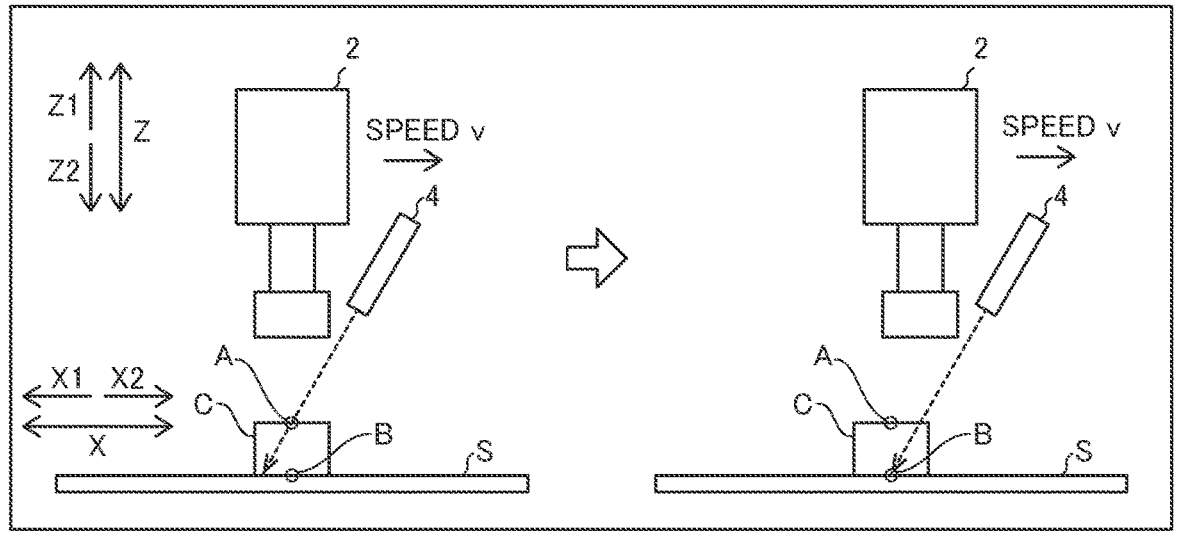
FIG. 3 is a diagram for illustrating height measurement of the board inspection device according to the first embodiment of the present disclosure.
Figure 4:
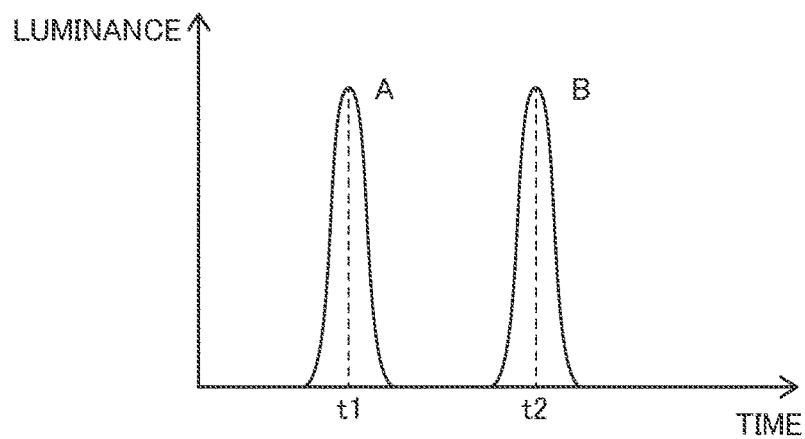
FIG. 4 is a diagram showing an example of a relationship between a peak luminance value and time at the time of height measurement of the board inspection device according to the first embodiment of the present disclosure.
Figure 5:
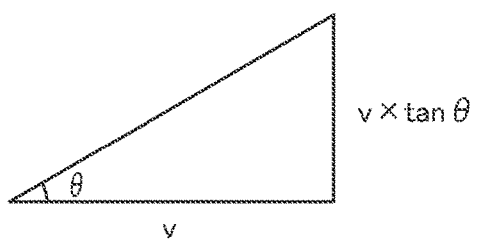
FIG. 5 is a diagram for illustrating a change in height per unit time of the board inspection device according to the first embodiment of the present disclosure.

As shown in FIG. 3, when images are captured while the imager 2 and the projectors (the first projector 3, the second projector 4, the third projector 5, and the fourth projector 6) are moved in the X2 direction at a speed v, a change over time between the luminance at a position A on the upper surface of an electronic component C and the luminance at a position B on the upper surface of the board S, which are located at a certain distance from a movement start position, is shown in FIG. 4. Although the second projector 4 is illustrated as the projector in an example shown in FIG. 3, the same applies to the other projectors (the first projector 3, the third projector 5, and the fourth projector 6).

The imager 2 captures images while shifting the same position to be imaged by a predetermined number of pixels (by one pixel, for example) as it moves. Then, a change in a luminance value at the same position is acquired.

In FIG. 4, time t1 represents the time at which a linear measurement light beam has been radiated to (projected onto) the position A. Furthermore, time t2 represents the time at which a linear measurement light beam has been radiated to the position B. In this case, the center of the linear measurement light beam passes through a higher position earlier. As shown in FIG. 5, the linear measurement light beam moves v per unit time, and thus assuming that the projection angle of the measurement light beam is θ, the amount of change in height per unit time is $-v \times \tan \theta$ in consideration of the projection direction of the measurement light beam.

Assuming that the height at a motion start position is 0, the height h1 at the elapsed time t1 is $-v \times \tan \theta \times t1$, and the height h2 at the elapsed time t2 is $-v \times \tan \theta \times t2$. The height at the position A is calculated by $h1-h2$.

In the first embodiment, the controller 1 removes reflected light noise based on the first measurement light beam and the second measurement light beam projected onto the board S and imaged by the imager 2, and acquires the height information of the board S. Furthermore, the controller 1 removes reflected light noise based on the third measurement light beam and the fourth measurement light beam projected onto the board S and imaged by the imager 2 and acquires the height information of the board S.

Figure 6:
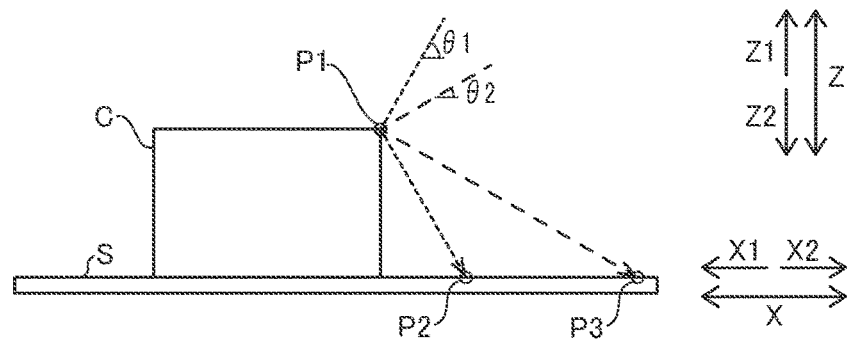
FIG. 6 is a diagram for illustrating reflection of measurement light beams of the board inspection device according to the first embodiment of the present disclosure.

For example, as shown in FIG. 6, the reflected light noise refers to a measurement light beam reflected at a position P1 of the electronic component C on the board S, the first measurement light beam with the projection angle θ1 of the measurement light beam reflected at the position P1 is reflected to a position P2 on the board S, and the second measurement light beam with the projection angle θ2 of the measurement light beam reflected at the position P1 is reflected to a position P3 on the board S. In this case, the first measurement light beam is imaged at the positions P1 and P2. Moreover, the second measurement light beam is imaged at the positions P1 and P3.

The controller 1 removes a measurement light beam at a position at which the position based on the first measurement light beam and the position based on the second measurement light beam do not overlap each other as reflected light noise. That is, the controller 1 does not remove the measurement light beams at the position P1 at which the positions of the first measurement light beam and the second measurement light beam overlap each other, but removes, as the reflected light noise, the measurement light beams at the positions P2 and P3 at which the positions of the first measurement light beam and the second measurement light beam do not overlap each other.

Figure 7:
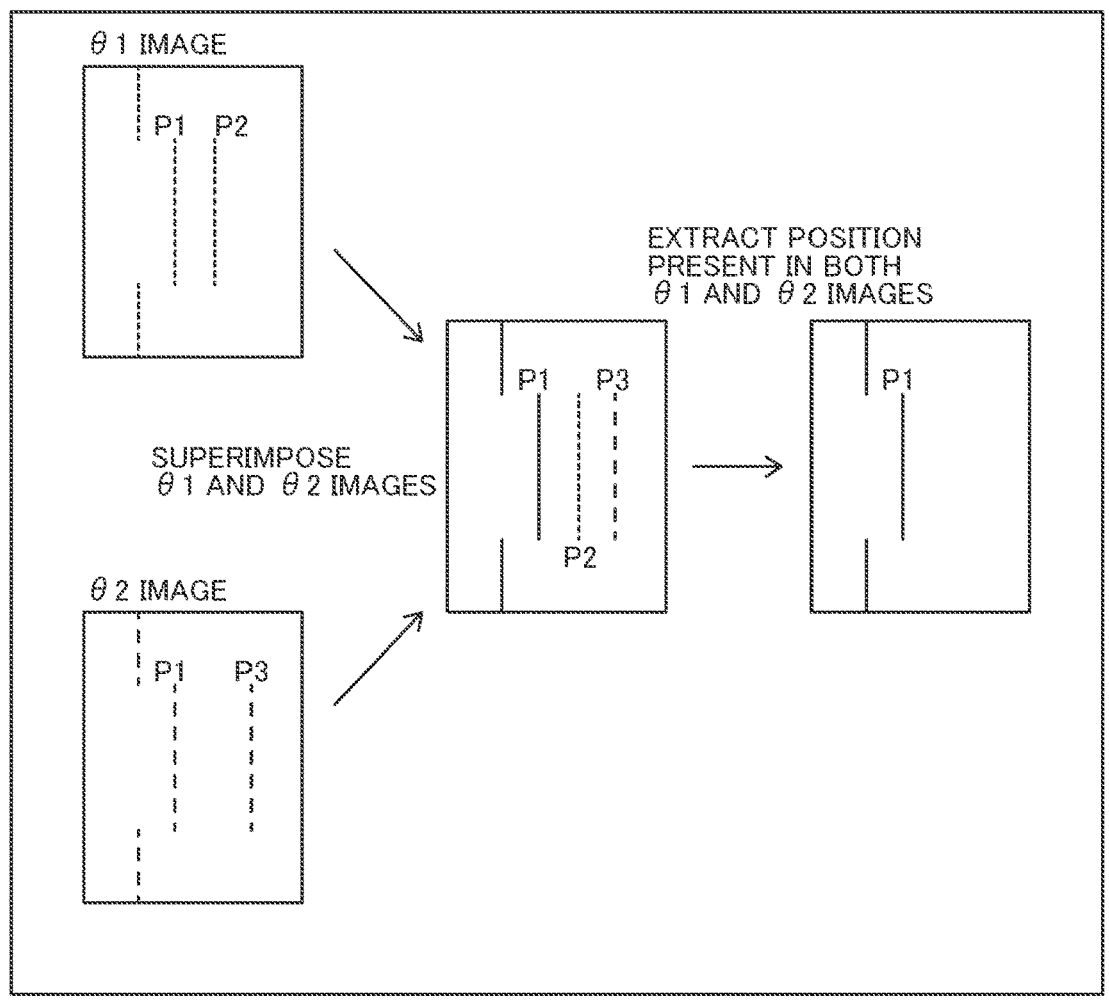
FIG. 7 is a diagram for illustrating removal of reflected light noise in the board inspection device according to the first embodiment of the present disclosure.

As shown in FIG. 7, the controller 1 superimposes the image at the position P1 with the projection angle θ1 and the image at the position P1 with the projection angle θ2. Then, the controller 1 extracts a position present in both the image at the position P1 with the projection angle θ1 and the image at the position P1 with the projection angle θ2. Thus, an image with reflected light noise removed can be acquired by extracting only a location that is shining in all images when the images obtained by imaging the same location using linear measurement light beams with different projection angles are superimposed. In the image extracted by superimposing, the average luminance value or the maximum luminance value of a plurality of images may be used as the luminance value of the extracted position.

Figure 8:
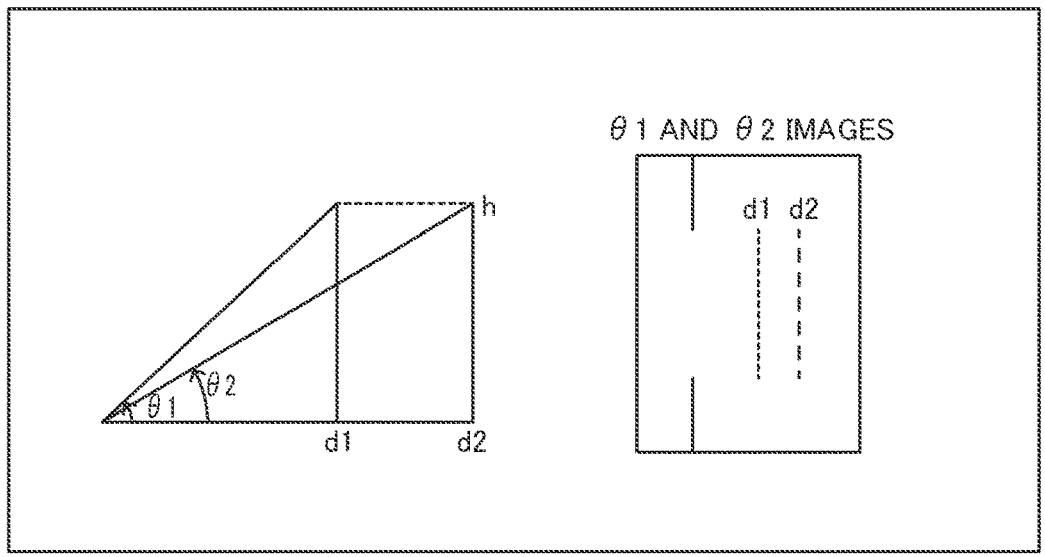
FIG. 8 is a diagram for illustrating a difference in height position due to different projection angles of the board inspection device according to the first embodiment of the present disclosure.

As shown in FIG. 8, when measurement light beams with different projection angles are radiated (projected), the projection positions of the measurement light beams are different even at the same height position. For example, at the height h, the first measurement light beam with the projection angle θ1 is projected onto a position d1, and the second measurement light beam with the projection angle θ2 is projected onto a position d2. That is, when the image of the first measurement light beam and the image of the second measurement light beam are superimposed in this state, the measurement light beams at the correct height do not overlap each other and thus are removed.

Figure 9:
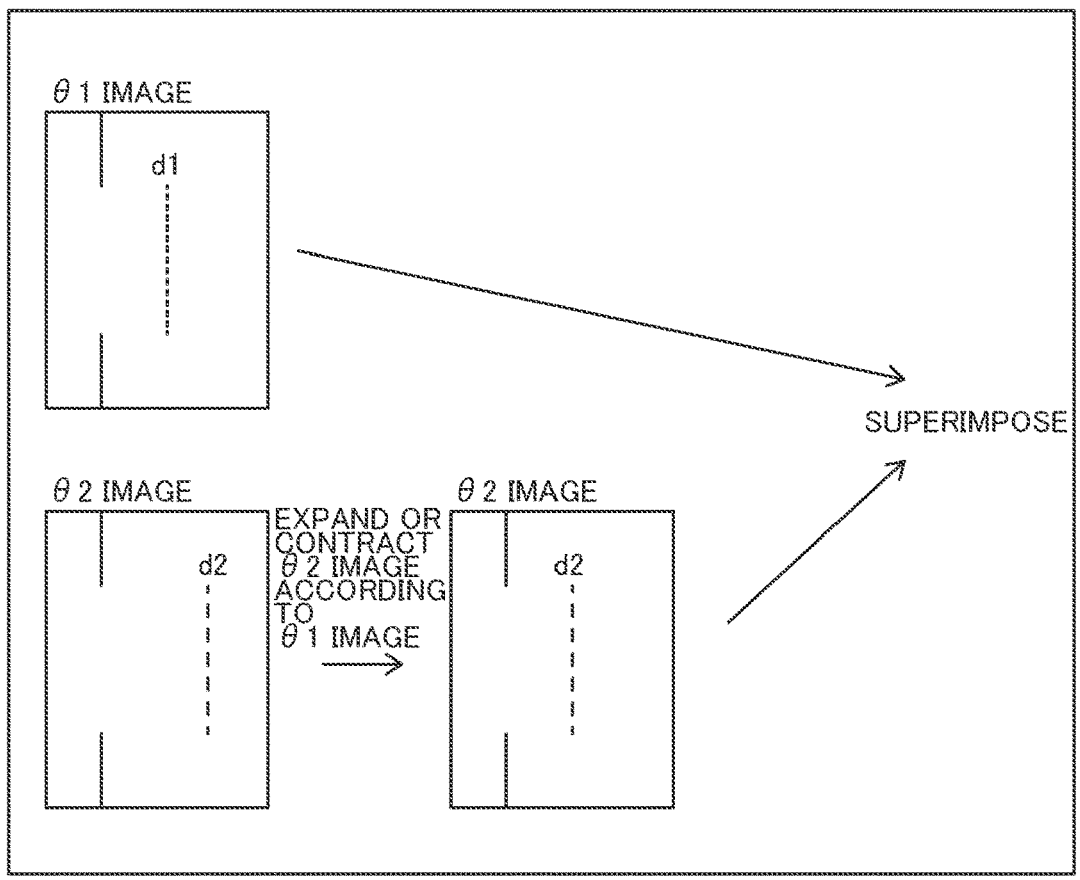
FIG. 9 is a diagram for illustrating correction by expanding or contracting an image with a different projection angle of the board inspection device according to the first embodiment of the present disclosure.

As shown in FIG. 9, the controller 1 corrects the position based on the second measurement light beam by expanding or contracting the image of the second measurement light beam such that the position based on the second measurement light beam corresponds to the position based on the first measurement light beam, based on the projection angle of the first projector 3 and the projection angle of the second projector 4.

The relationship between the deviation amount Δx of the linear measurement light beam when the lens resolution and the imaging pitch are 1 and the height H is expressed as H=Δx×tan θ. Therefore, the controller 1 expands or contracts the image of the second measurement light beam with the projection angle θ2 according to the value of a such that Δx×tan θ1=Δx×tan θ2×a. In the first embodiment, the controller 1 obtains the height information from the temporal maximum luminance value, and thus the luminance change on a line of interest is increased or decreased when the image is expanded or contracted. Therefore, the height position is not affected.

Figure 11:
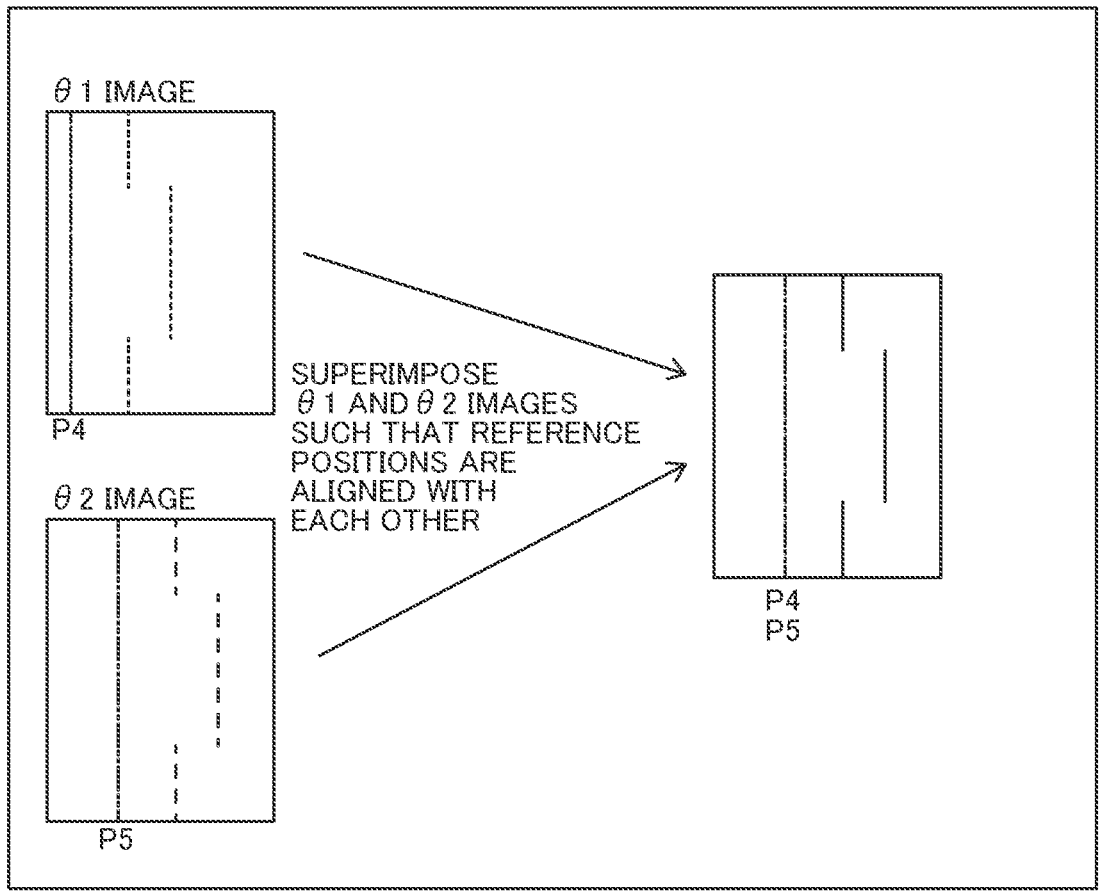
FIG. 11 is a diagram for illustrating correction using the reference positions of images with different projection angles of the board inspection device according to the first embodiment of the present disclosure.

As shown in FIG. 11, the controller 1 shifts and corrects the position based on the second measurement light beam such that the position based on the second measurement light beam corresponds to the position based on the first measurement light beam, based on the first measurement light beam and the second measurement light beam projected onto a reference height position. In other words, it is necessary to set reference positions to superimpose images when images with different projection angles are superimposed.

Figure 10:
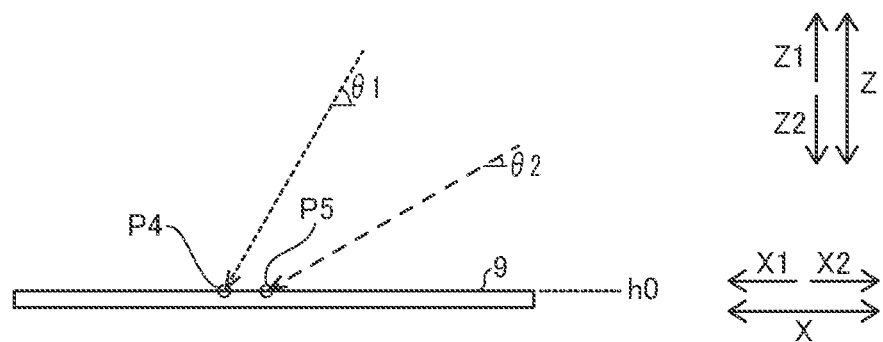
FIG. 10 is a diagram for illustrating setting of reference positions of the board inspection device according to the first embodiment of the present disclosure.

As shown in FIG. 10, the controller 1 measures a flat jig 9 in advance, and superimposes images with different projection angles based on the positions of the linear measurement light beams at that time. The controller 1 stores a position P4 of the jig 9 onto which the first measurement light beam with the projection angle θ1 is projected, and a position P5 of the jig 9 onto which the second measurement light beam with the projection angle θ2 is projected as the reference position coordinates of the respective measurement light beams. Then, as shown in FIG. 11, the controller 1 superimposes the image of the first measurement light beam with the projection angle θ1 and the image of the second measurement light beam with the projection angle θ2 based on the reference position coordinates.

Preprocessing

Preprocessing by the controller 1 is now described with reference to FIG. 12.

Figure 12:
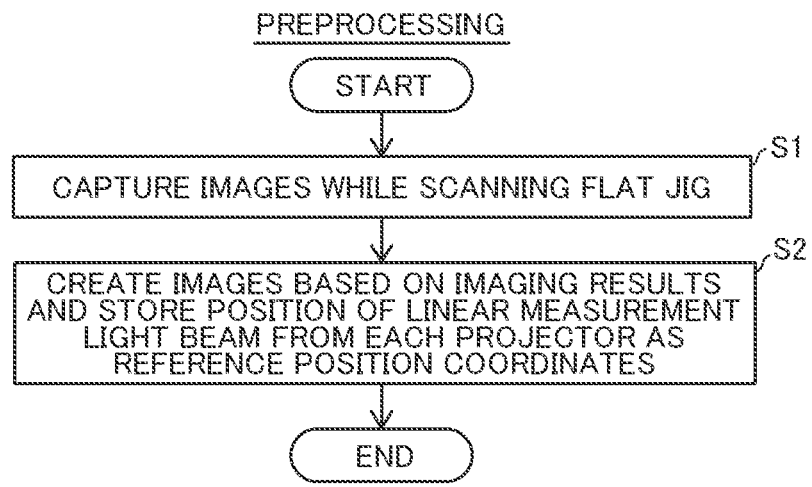
FIG. 12 is a flowchart for illustrating preprocessing by a controller of the board inspection device according to the first embodiment of the present disclosure.

In step S1 of FIG. 12, images are captured by the imager 2 while the flat jig 9 is irradiated with the measurement light beams and scanned. In step S2, images are created based on the imaging results by a method for measuring the height from the temporal maximum luminance position. Furthermore, the position of the linear measurement light beam from each projector is stored as the reference position coordinates.

Measurement Process

A measurement process by the controller 1 is now described with reference to FIG. 13.

Figure 13:
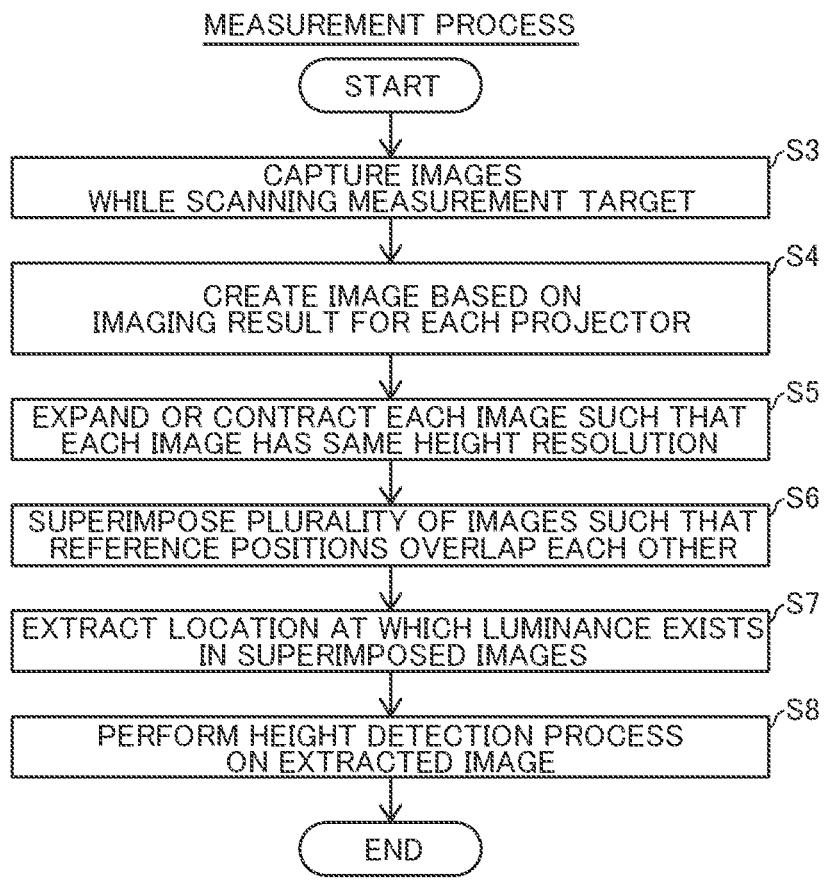
FIG. 13 is a flowchart for illustrating a measurement process by the controller of the board inspection device according to the first embodiment of the present disclosure.

In step S3 of FIG. 13, the imager 2 captures images while the measurement target (board S) is irradiated with the measurement light beams and scanned. In step S4, images are created based on the imaging results by the method for measuring the height from the temporal maximum luminance position. Furthermore, an image is created for each projector (the first projector 3, the second projector 4, the third projector 5, and the fourth projector 6).

In step S5, each image is expanded or contracted to have the same height resolution. In step S6, a plurality of images are superimposed such that the reference positions overlap each other.

In step S7, a location at which luminance exists in the superimposed images is extracted. In step S8, a height detection process is performed on the extracted image. That is, the height information at each position is calculated based on the remaining measurement light beams.

In the first embodiment, as shown in FIG. 2, in addition to the first projector 3 and the second projector 4 arranged on the X2 direction side with respect to the imager 2, the third projector 5 and the fourth projector 6 are arranged on the X1 direction side with respect to the imager 2 in order to enable measurement even when the projection angle of the measurement light beam causes a shadow.

In the first embodiment, the controller 1 removes reflected light noise based on the first measurement light beam, the second measurement light beam, the third measurement light beam, and the fourth measurement light beam projected onto the board S and imaged by the imager 2, and acquires the height information of the board S.

The reflected light noise is removed using the third projector 5 and the fourth projector 6 similarly to a case in which the first projector 3 and the second projector 4 are used. Furthermore, shape determination is performed as to whether or not there is an influence of a shadow using the first projector 3 and the third projector 5 arranged on the opposite sides with respect to the imager 2. That is, the image based on the first measurement light beam from the first projector 3 and the image based on the third measurement light beam from the third projector 5 are superimposed to extract an overlapping position. When there is an overlapping position, it is determined that the region is flat without casting a shadow by both the first measurement light beam and the third measurement light beam. When there is no overlapping position, it is determined that the region is not flat because a shadow is cast by at least one of the first measurement light beam or the third measurement light beam.

Figure 14:
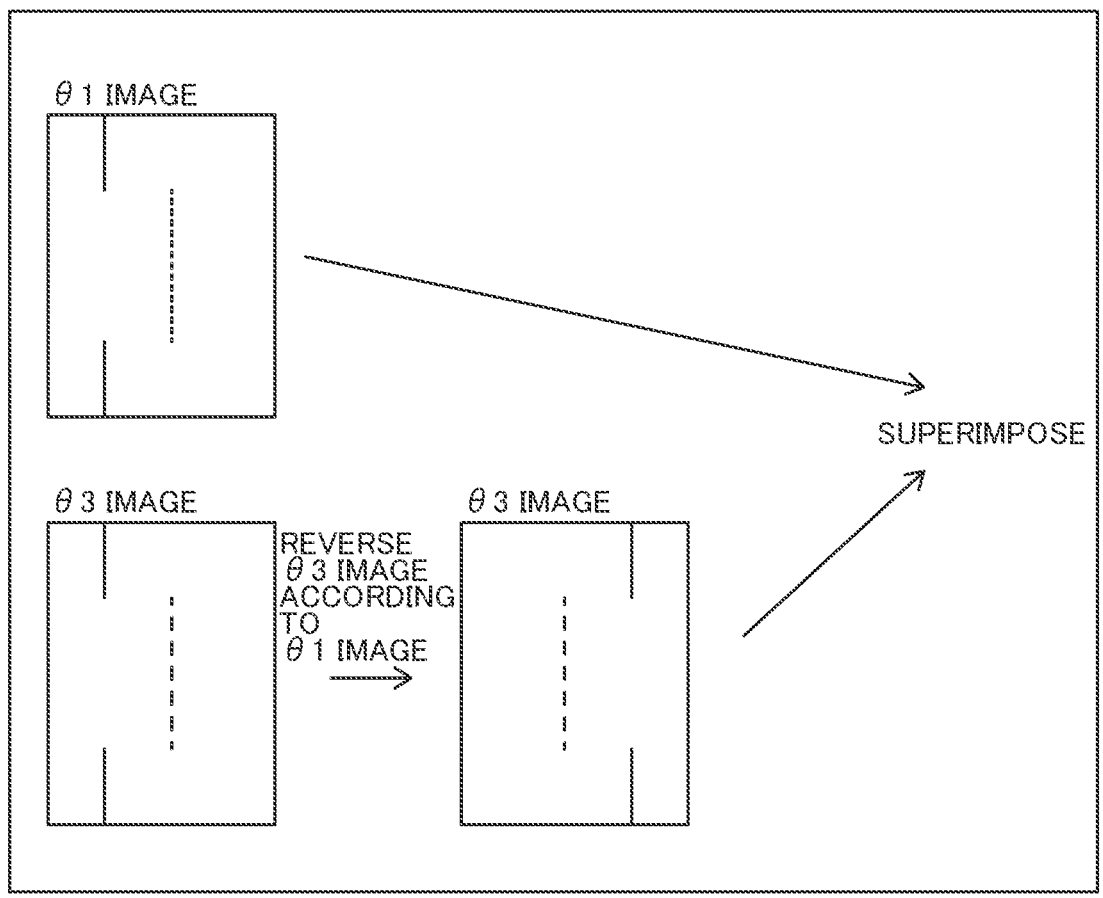
FIG. 14 is a diagram for illustrating correction by reversing an image with a different projection angle of the board inspection device according to the first embodiment of the present disclosure.

The images based on the measurement light beams projected from projection directions on the opposite sides have reverse projection directions, and thus the positions of the linear measurement light beams are reversed. Therefore, as shown in FIG. 14, the controller 1 reverses and corrects the positions based on the third measurement light beam and the fourth measurement light beam such that they correspond to the position based on the first measurement light beam.

In the first embodiment, the controller 1 acquires a plurality of measurement heights based on the first measurement light beam, the second measurement light beam, the third measurement light beam, and the fourth measurement light beam projected onto the board S and imaged by the imager 2, and compares the acquired plurality of measurement heights to acquire one piece of height information of the board S.

Specifically, the controller 1 superimposes the image of the first measurement light beam projected from the first projector 3 and the image of the second measurement light beam projected from the second projector 4, removes the reflected light noise, and acquires first height information H1. Furthermore, the controller 1 superimposes the image of the third measurement light beam projected from the third projector 5 and the image of the fourth measurement light beam projected from the fourth projector 6, removes the reflected light noise, and acquires second height information H2. Moreover, the controller 1 superimposes the image of the first measurement light beam projected from the first projector 3 and the image of the third measurement light beam projected from the third projector 5, removes the reflected light noise, and acquires third height information H3. Then, the controller 1 classifies the three pieces of height information into cases based on the obtained height conditions, and obtains one piece of height information.

When there is the height information H3 acquired by radiating the measurement light beams from both sides with respect to the imager 2, the controller 1 determines that a position on the board S to be measured is planar, and employs the height information H3. When there is only one of the height information H1 and the height information H2 acquired by radiating the measurement light beam from one side with respect to the imager 2, the controller 1 determines the position of the shadow of the measurement target, and employs the height information H1 or H2, whichever is present. When there are both the height information H1 and the height information H2 acquired by radiating the measurement light beams from one side with respect to the imager 2, the controller 1 determines that the measurement target has a complex shape that is not a planar shape. In this case, the controller 1 employs the average value of the two pieces of height information H1 and H2 when a difference between the height information H1 and the height information H2 is less than a predetermined value N. When the difference between the height information H1 and the height information H2 is equal to or greater than the predetermined value N, the controller 1 employs the height information of the linear measurement light beam having a higher luminance.

Height Information Acquisition Process

A height information acquisition process performed by the controller 1 to acquire the height information based on the first measurement light beam, the second measurement light beam, the third measurement light beam, and the fourth measurement light beam is now described with reference to FIG. 15.

Figure 15:
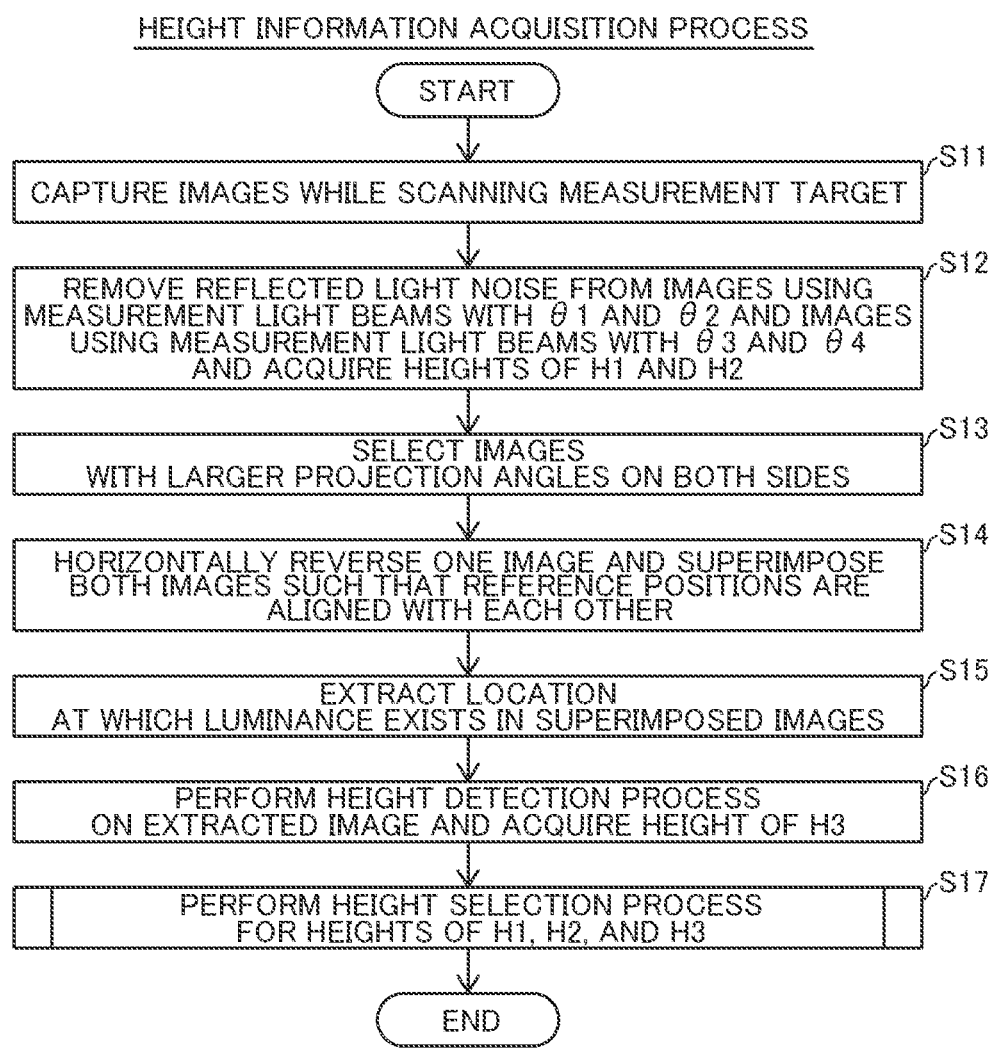
FIG. 15 is a flowchart for illustrating a height information acquisition process by the controller of the board inspection device according to the first embodiment of the present disclosure.

In step S11 of FIG. 15, images are captured by the imager 2 while the measurement target (board S) is irradiated with the measurement light beams and scanned. In step S12, the height information H1 obtained by removing the reflected light noise from the images captured using the measurement light beams (the first measurement light beam and the second measurement light beam) with the projection angles $\theta1$ and $\theta2$, and the height information H2 obtained by removing the reflected light noise from the images captured using the measurement light beams (the third measurement light beam and the fourth measurement light beam) with the projection angles $\theta3$ and $\theta4$ are acquired.

In step S13, images of the measurement light beams with larger projection angles (more vertical angles) on both sides with respect to the imager 2 are selected. In this case, the image of the first measurement light beam with the projection angle $\theta1$ is selected on the X2 direction side with respect to the imager 2. On the X1 direction side with respect to the imager 2, the image of the third measurement light beam with the projection angle $\theta3$ is selected. Thus, shadows are less likely to occur as compared with a case in which the projection angles are smaller. In step S14, one of the two selected images is horizontally reversed, and the two images are superimposed such that the reference positions are aligned with each other.

In step S15, a location at which luminance exists in the superimposed images is extracted. In step S16, the height detection process is performed on the extracted image, and the height information H3 from which the reflected light noise has been removed is acquired. That is, the height information H3 at each position is calculated based on the remaining measurement light beams.

In step S17, one of the height information H1, the height information H2, and the height information H3 is selected for each of the measurement positions.

Height Selection Process

A height selection process in step S17 of FIG. 15 is now described with reference to FIG. 16.

Figure 16:
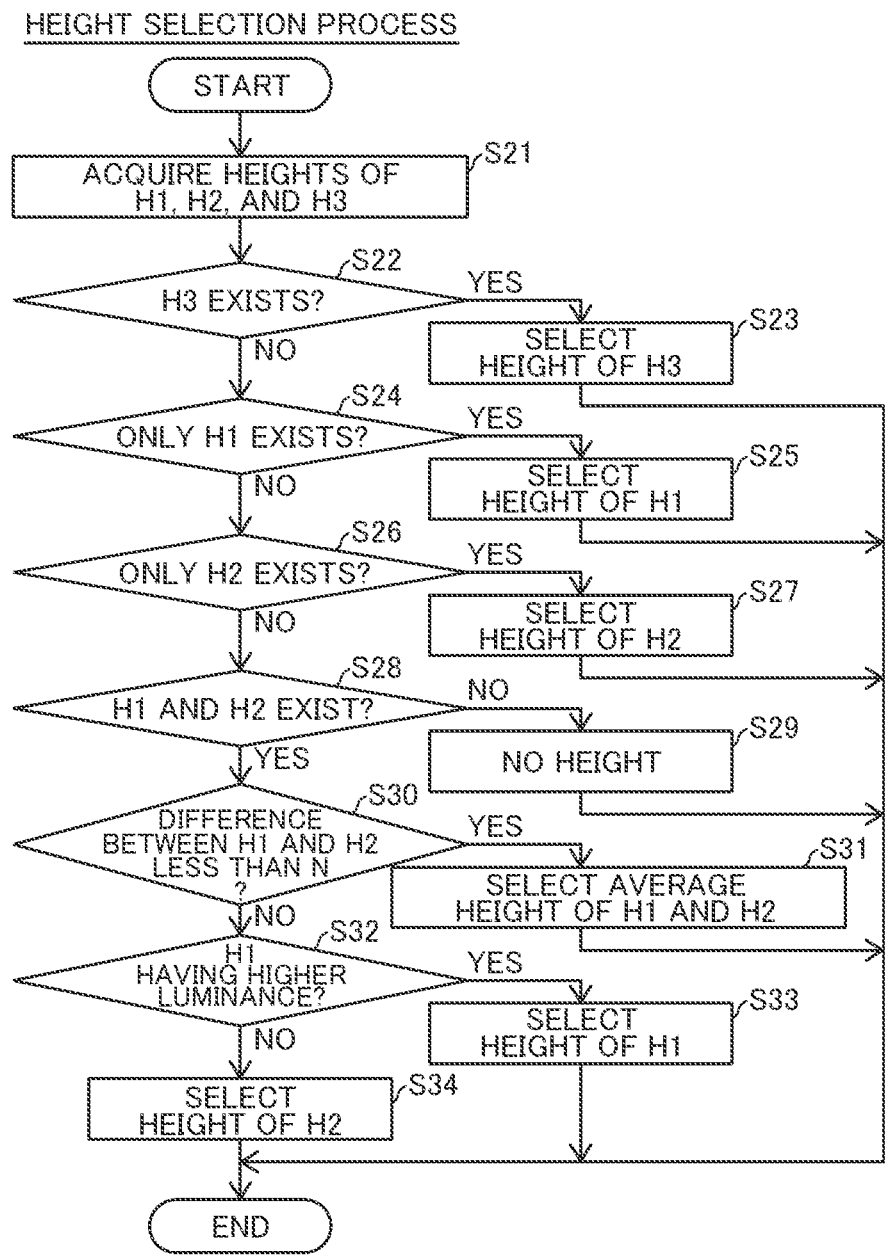
FIG. 16 is a flowchart for illustrating a height selection process by the controller of the board inspection device according to the first embodiment of the present disclosure.

In step S21 of FIG. 16, three pieces of height information H1, H2, and H3 are acquired.

In step S22, it is determined whether or not the height information H3 exists. When the height information H3 exists, the process advances to step S23, and the height information H3 is selected. When the height information H3 does not exist, the process advances to step S24.

In step S24, it is determined whether or not only the height information H1 exists among the height information H1 and the height information H2. When only the height information H1 exists, the process advances to step S25, and the height information H1 is selected. When it is not in a state in which only the height information H1 exists among the height information H1 and the height information H2, the process advances to step S26.

In step S26, it is determined whether or not only the height information H2 exists among the height information H1 and the height information H2. When only the height information H2 exists, the process advances to step S27, and the height information H2 is selected. When it is not in a state in which only the height information H2 exists among the height information H1 and the height information H2, the process advances to step S28.

In step S28, it is determined whether or not both the height information H1 and the height information H2 exist. When both the height information H1 and the height information H2 do not exist, the process advances to step S29, and "no height information" is selected. When both the height information H1 and the height information H2 exist, the process advances to step S30.

In step S30, it is determined whether or not the difference between the height information H1 and the height information H2 is less than the predetermined value N. When the difference is less than the predetermined value N, the process advances to step S31, and height information obtained by averaging the height information H1 and the height information H2 is selected. When the difference is not less than the predetermined value N (when the difference is equal to or greater than the predetermined value N), the process advances to step S32.

In step S32, it is determined whether or not the height information H1 has a higher luminance of the linear measurement light beam among the height information H1 and the height information H2 (has a higher luminance value). When the height information H1 has a higher luminance, the process advances to step S33, and the height information H1 is selected. When the height information H1 does not have a higher luminance (when the height information H2 has a higher luminance), the process advances to step S34, and the height information H2 is selected.

Advantageous Effects of First Embodiment

According to the first embodiment, the following advantageous effects are achieved.

According to the first embodiment, as described above, the measurement unit 10 includes the controller 1 configured or programmed to remove the reflected light noise based on the first measurement light beam and the second measurement light beam projected from different inclination angles and acquire the height information of the board S corresponding to the measurement target. Accordingly, using the fact that the position of the reflected light noise derived from the first measurement light beam and the position of the reflected light noise derived from the second measurement light beam are different from each other because the first measurement light beam and the second measurement light beam projected from different inclination angles are imaged for one position on the board S, each reflected light noise can be removed. Thus, the board S can be accurately measured by removing the reflected light noise. Furthermore, unlike a case in which imaging is performed while the imager 2 is moved in the optical axis direction, it is not necessary to perform imaging while the imager 2 is moved in the optical axis direction at one position, and thus an increase in the imaging time at one position can be reduced or prevented. Consequently, the board S corresponding to the measurement target can be accurately measured by removing the reflected light noise caused by reflection of the measurement light beams while an increase in the time required to measure the board S corresponding to the measurement target is reduced or prevented.

According to the first embodiment, as described above, the imager 2, the first projector 3, and the second projector 4 are operable to project and image the measurement light beams while moving relative to the board S. Accordingly, even when a plurality of positions on the board S are measured while the imager 2, the first projector 3, and the second projector 4 move relative to the board S, it is not necessary to perform imaging while moving the imager 2 in the optical axis direction at each position to which the imager 2, the first projector 3, and the second projector 4 have moved relative to the board S. Thus, an increase in the imaging time can be reduced or prevented, and thus an increase in the time required to measure the board S can be effectively reduced or prevented.

According to the first embodiment, as described above, the controller 1 is configured or programmed to remove, as the reflected light noise, the measurement light beams at the positions at which the position based on the first measurement light beam and the position based on the second measurement light beam do not overlap each other. Accordingly, when the first measurement light beam and the second measurement light beam projected from different inclination angles are projected onto the same position, the first measurement light beam and the second measurement light beam are reflected to different positions due to a difference in inclination angle. Thus, while the first measurement light beam and the second measurement light beam overlap each other at the positions onto which the same are directly projected, the reflected light noise does not overlap in position. Therefore, the reflected light noise can be easily discriminated, and thus the reflected light noise can be easily removed.

According to the first embodiment, as described above, the controller 1 is configured or programmed to correct the position based on the second measurement light beam by expanding or contracting the image of the second measurement light beam such that the position based on the second measurement light beam corresponds to the position based on the first measurement light beam, based on the projection angle of the first projector 3 and the projection angle of the second projector 4. Accordingly, a scale deviation caused by a difference between the inclination angles of the first measurement light beam and the second measurement light beam can be corrected by expansion or contraction, and thus the reflected light noise can be accurately removed.

According to the first embodiment, as described above, the controller 1 is configured or programmed to shift and correct, based on the first measurement light beam and the second measurement light beam projected onto the reference height position, the position based on the second measurement light beam such that the position based on the second measurement light beam corresponds to the position based on the first measurement light beam. Accordingly, a positional deviation caused by a difference between the inclination angles of the first measurement light beam and the second measurement light beam can be corrected, and thus the reflected light noise can be accurately removed.

According to the first embodiment, as described above, the measurement unit 10 includes the third projector 5 on the second side opposite to the first side with respect to the imager 2 to project the third measurement light beam onto the board S from the direction inclined at the third angle θ3 with respect to the horizontal direction, and the fourth projector 6 on the second side with respect to the imager 2 to project the fourth measurement light beam onto the board S from the direction inclined at the fourth angle θ4 different from the third angle θ3 with respect to the horizontal direction. Furthermore, the controller 1 is configured or programmed to remove the reflected light noise based on the first measurement light beam, the second measurement light beam, the third measurement light beam, and the fourth measurement light beam projected onto the board S and imaged by the imager 2, and acquire the height information of the board S. Accordingly, even when a shadow occurs due to the shape of the board S when the measurement light beam is projected from the first side with respect to the imager 2, the occurrence of the shadow can be reduced or prevented by projecting the measurement light beam from the second side with respect to the imager 2. Therefore, the occurrence of an unmeasurable portion on the board S can be reduced or prevented.

According to the first embodiment, as described above, the controller 1 is configured or programmed to acquire the plurality of measurement heights based on the first measurement light beam, the second measurement light beam, the third measurement light beam, and the fourth measurement light beam projected onto the board S and imaged by the imager 2, and compare the acquired plurality of measurement heights to acquire one piece of height information of the board S. Accordingly, even when the measurement heights at one position acquired using the first measurement light beam, the second measurement light beam, the third measurement light beam, and the fourth measurement light beam are different from each other, the height information can be acquired as one measurement height, and thus the height information of the board S can be accurately acquired while the occurrence of an unmeasurable portion on the board S is reduced or prevented.

According to the first embodiment, as described above, the controller 1 is configured or programmed to reverse and correct the positions based on the third measurement light beam and the fourth measurement light beam such that the positions based on the third measurement light beam and the fourth measurement light beam correspond to the position based on the first measurement light beam. Accordingly, the first measurement light beam, the third measurement light beam, and the fourth measurement light beam having reverse inclination angles with respect to the imager 2 can be aligned in the same direction, and thus a process to remove the reflected light noise can be easily performed.

Second Embodiment

The configuration of a board inspection device 200 according to a second embodiment of the present disclosure is now described with reference to FIGS. 17 to 24. In the second embodiment, an example of a configuration to remove reflected light noise based on a measurement light beam projected from one projector unlike the first embodiment is described. The same or similar configurations as those of the first embodiment are denoted by the same reference numerals, and detailed description thereof is omitted.

Figure 17:
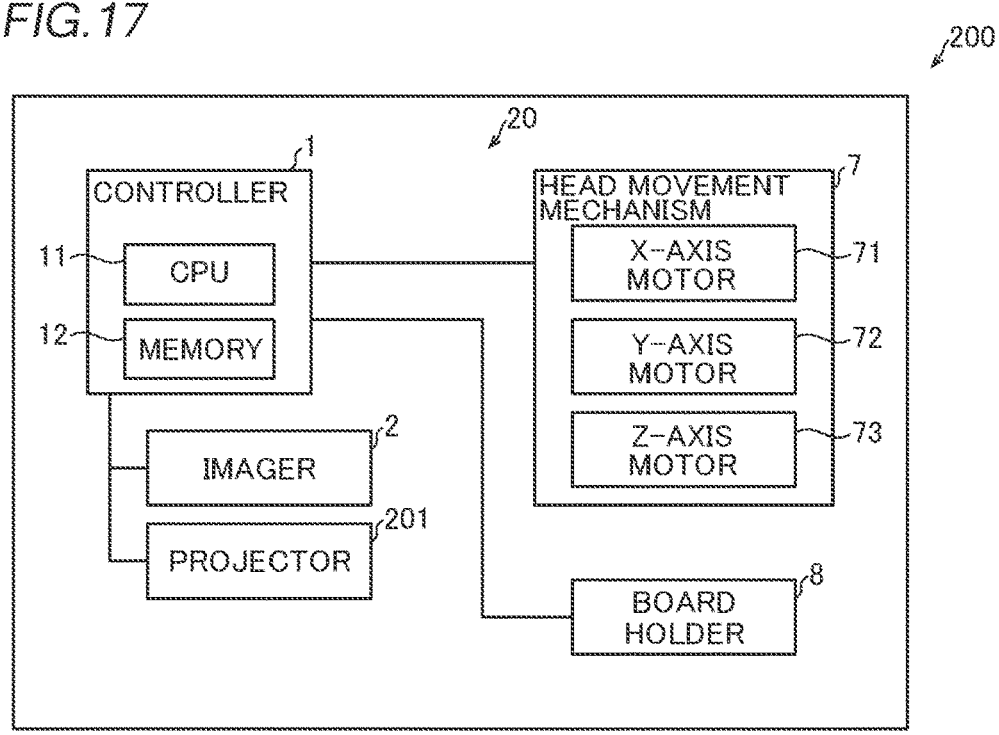
FIG. 17 is a block diagram showing a board inspection device according to a second embodiment of the present disclosure.

As shown in FIG. 17, the board inspection device 200 according to the second embodiment images a board S (see FIG. 18) during or after manufacture in a board manufacturing process as an inspection target, and performs various inspections on the board S and electronic components C (see FIG. 18) on the board S. The board S is an example of a "measurement target" in the claims.

As shown in FIG. 17, the board inspection device 200 includes a measurement unit 20 that measures the board S.

The measurement unit 20 includes a controller 1, an imager 2, and a projector 201. The board inspection device 200 also includes a head movement mechanism 7 that moves a head on which the imager 2 and the projector 201 are provided. The head movement mechanism 7 includes an X-axis motor 71, a Y-axis motor 72, and a Z-axis motor 73. The board inspection device 200 also includes a board holder 8 that holds the board S on which the electronic components C have been mounted. The measurement unit 20 is an example of a "measurement device" in the claims.

The measurement unit 20 measures a three-dimensional shape by an optical cutting method. The measurement unit 20 is moved to a predetermined position above the board S by the head movement mechanism 7 to image the board S and the electronic components C on the board S for visual inspection, for example.

The imager 2 images the board S as a measurement target. The imager 2 images the board S onto which a linear measurement light beam has been projected by the projector 201.

Figure 18:
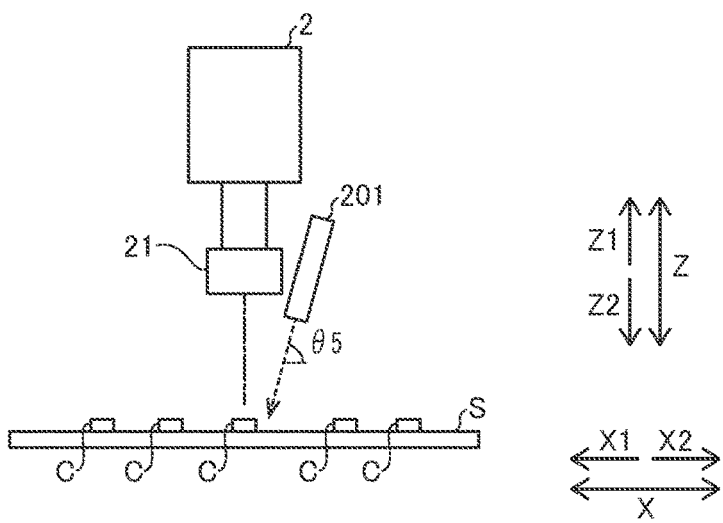
FIG. 18 is a diagram showing an imager and a projector of the board inspection device according to the second embodiment of the present disclosure.

As shown in FIG. 18, the projector 201 is arranged on a first side (X2 direction side) with respect to the imager 2. The projector 201 projects a linear measurement light beam onto the board S from a direction inclined at an angle θ5 with respect to a horizontal direction.

The controller 1 acquires the three-dimensional shape (height information) of the board S based on the linear measurement light beam projected onto the board S. Specifically, the controller 1 moves the imager 2 and the projector 201 relative to the board S in a predetermined direction (X direction), and acquires height information from the spatial position of the board S at a measurement position.

Figure 22:
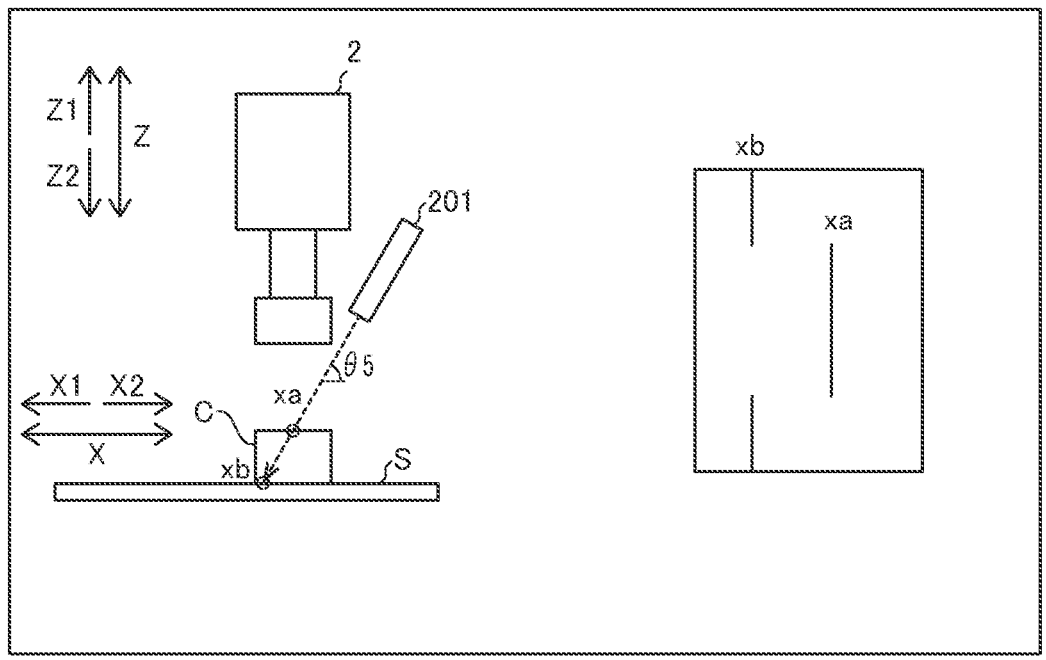
FIG. 22 is a diagram for illustrating height measurement of the board inspection device according to the second embodiment of the present disclosure.
Figure 23:
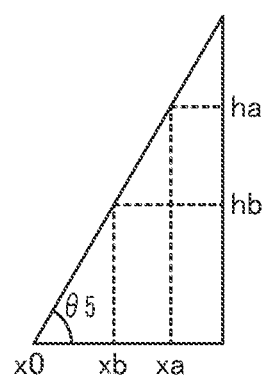
FIG. 23 is a diagram for illustrating a height with respect to a line position of the board inspection device according to the second embodiment of the present disclosure.

Specifically, as shown in FIG. 22, the controller 1 radiates a measurement light beam at a projection angle θ5 from the projector 201. In this case, the measurement light beam is projected onto a position xa on the upper surface of an electronic component C, and the measurement light beam is projected onto a position xb on the upper surface of the board S. As shown in FIG. 23, the controller 1 calculates the height ha of xa as ha=xa×tan θ5 based on the position of x0 at which the x coordinate is 0. The controller 1 calculates the height hb of xb as hb=xb×tan θ5. The imager 2 and the projector 201 move in the X direction, and thus when the heights of the board S and the electronic component C at the same position are compared with each other, imaging and height calculation are repeated while the imaging position is shifted little by little to create a height table.

In the second embodiment, the controller 1 acquires a measurement height with a higher luminance of the measurement light beam as the height information of the board S when a plurality of measurement heights are acquired for the same position due to reflected light noise caused by reflection of the measurement light beam from the board S corresponding to the measurement target.

Specifically, the controller 1 acquires the height of the board S for all measurement light beams imaged by the imager 2, including the reflected light noise, and acquires the measurement height with a higher luminance of the measurement light beam as the height information of the board S when the plurality of measurement heights are acquired for the same position.

Figure 19:
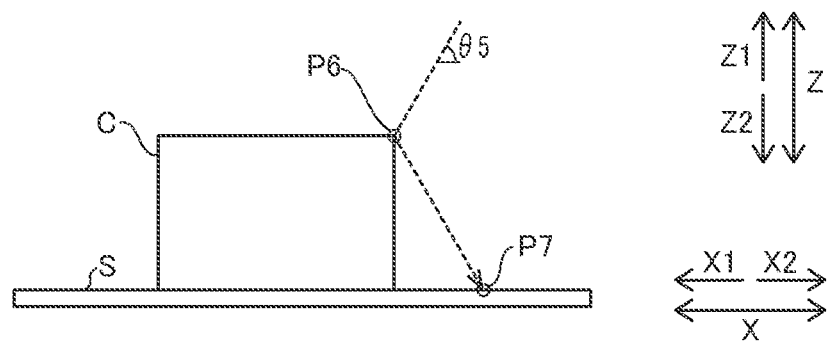
FIG. 19 is a diagram for illustrating reflection of a measurement light beam of the board inspection device according to the second embodiment of the present disclosure.

For example, as shown in FIG. 19, the reflected light noise refers to a measurement light beam reflected at a position P6 of the electronic component C on the board S and reflected to a position P7 on the board S. In this case, the measurement light beam is imaged at the positions P6 and P7.

Figure 20:
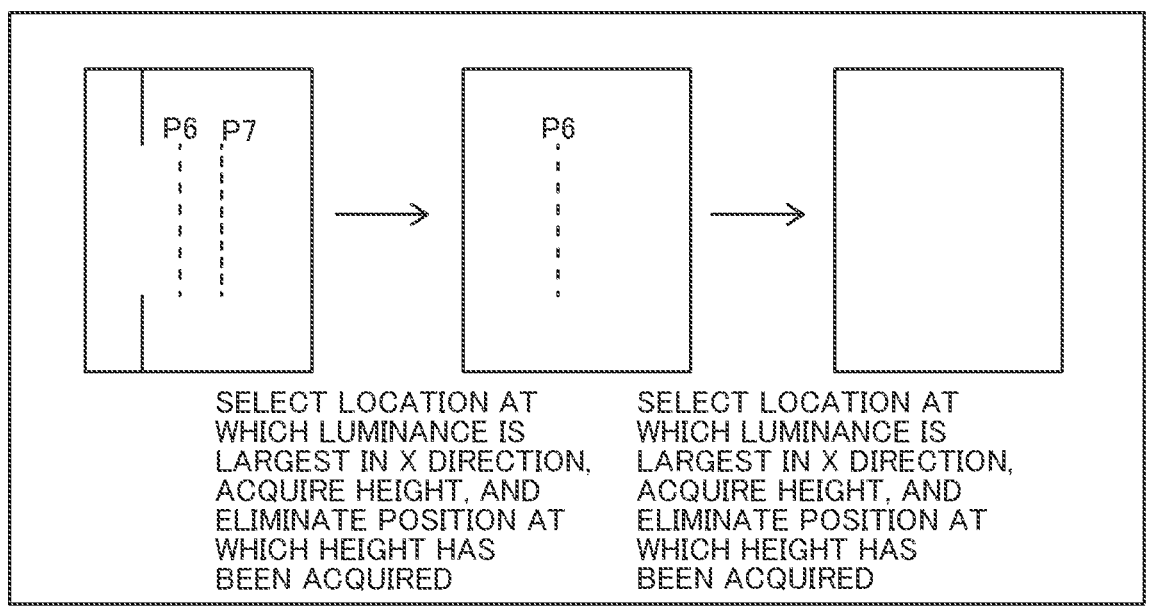
FIG. 20 is a diagram for illustrating measurement height acquisition of the board inspection device according to the second embodiment of the present disclosure.

As shown in FIG. 20, the controller 1 selects a location at which the peak luminance value of a line light beam is the largest for each line in a transverse direction (X direction) and acquires the height. In an example shown in FIG. 20, the luminance value at the position P7 is higher than that at the position P6, and thus the controller 1 acquires the height based on a position at the position P7. Then, the controller 1 eliminates the measurement light beam at the position P7 from an image. Then, the controller 1 selects a location at which the peak luminance value of a line light beam is the largest for each line in the transverse direction (X direction) from the image from which the position P7 has been eliminated and acquires the height. In the example shown in FIG. 20, the measurement light beam remains at the position P6, and thus the controller 1 acquires the height based on a position at the position P6. Then, the controller 1 eliminates the measurement light beam at the position P6 from the image. The controller 1 performs a similar process for other positions on the board S.

Figure 21:
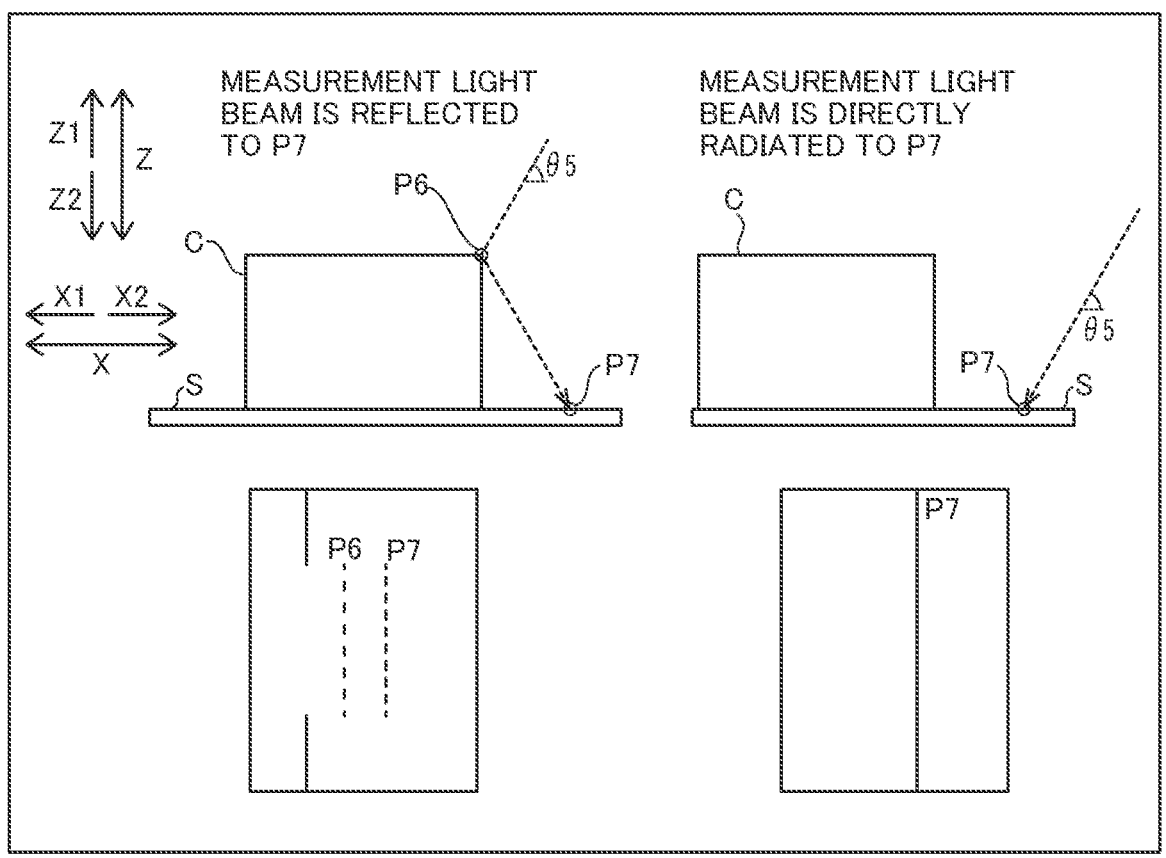
FIG. 21 is a diagram for illustrating measurement height adoption of the board inspection device according to the second embodiment of the present disclosure.

As shown in FIG. 21, a similar process is performed for other positions on the board S such that the height of the position P7 is acquired even when the measurement light beam is directly radiated to the position P7. In this case, the controller 1 compares the magnitudes of the luminance values of the used measurement light beams for a plurality of heights of the position P7. The controller 1 then selects the height at which the luminance value is the largest as the height of the position P7. That is, the measurement light beam directly projected onto the position P7 is brighter than the measurement light beam reflected at the position P6 and projected onto the position P7, and thus the darker one is removed as reflected light noise.

In addition to the height erroneously measured by the reflected light noise, two or more heights may be measured, and thus when a difference between the two or more heights is less than a certain value, the average value may be calculated and selected as the height at that position. When the difference between the two or more heights is equal to or greater than the certain value, the luminance values of the measurement light beam are compared with each other.

Height Information Acquisition Process

A height information acquisition process by the controller 1 is now described with reference to FIG. 24.

Figure 24:
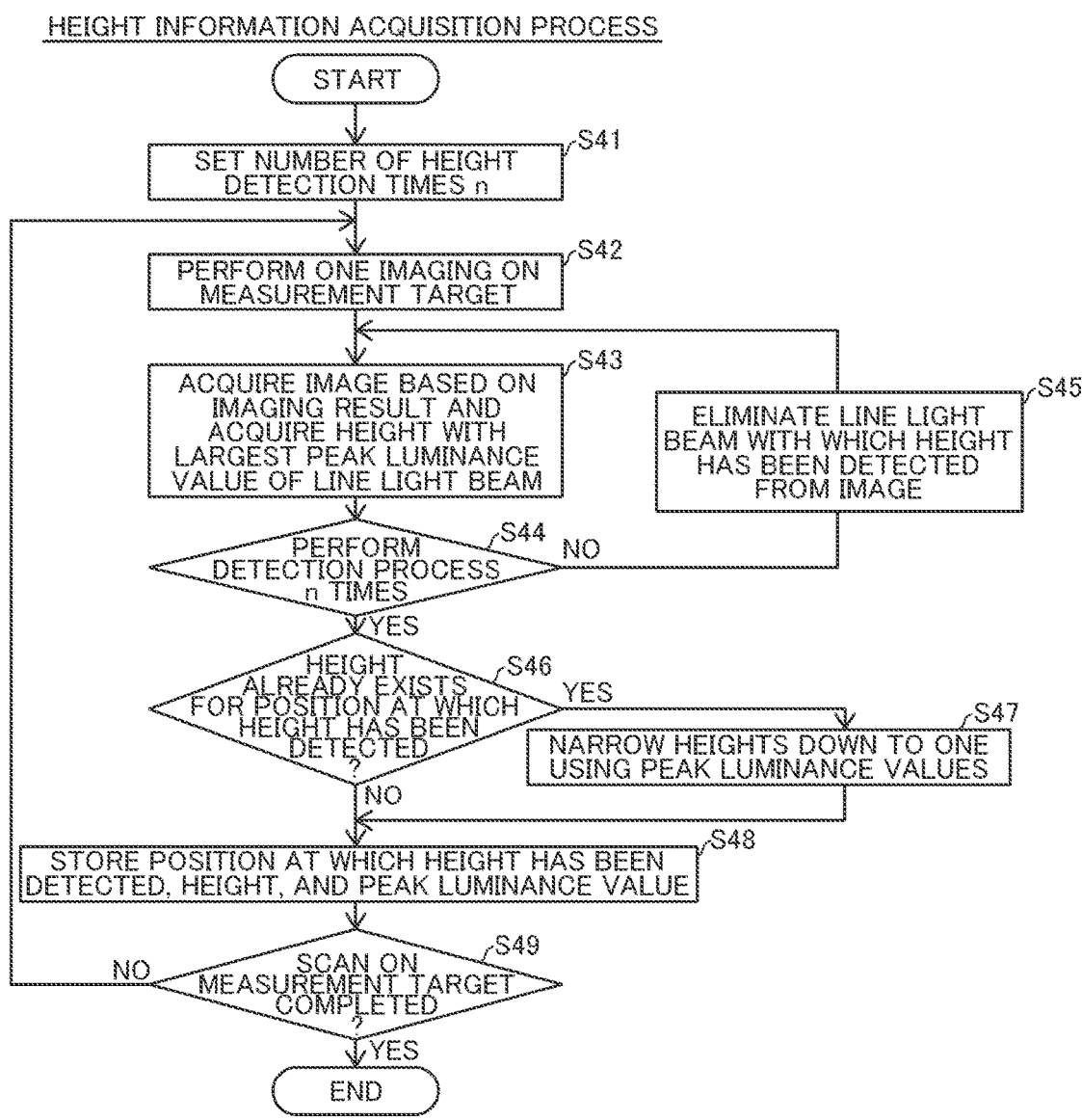
FIG. 24 is a flowchart for illustrating a height information acquisition process by a controller of the board inspection device according to the second embodiment of the present disclosure.

In step S41 of FIG. 24, the number of height detection times n is set. That is, the number of repetitions n of the process to select and eliminate the location at which the peak luminance value of the line light beam is the largest for each line in the transverse direction (X direction) is set. In step S42, the measurement light beam is radiated onto the board S corresponding to a measurement target, and the imager 2 captures an image once.

In step S43, an image used in a method for measuring a height and a position from a spatial position is acquired based on an imaging result, and the height of the linear measurement light beam having the largest peak luminance value is acquired for each line in the transverse direction (X direction). In step S44, it is determined whether or not the detection process has been performed n times. When the detection process has not been performed n times, the process advances to step S45, and when the detection process has been performed n times, the process advances to step S46.

In step S45, the linear measurement light beam with which the height has been detected is eliminated from the image. After that, the process returns to step S43. In step S46, it is determined whether or not the height already exists for the position at which the height has been detected. When the height already exists, the process advances to step S47, and when the height does not exist, the process advances to step S48.

In step S47, the peak luminance values are compared with each other, and the heights are narrowed down to one. That is, when there are a plurality of heights for the same position, the height with the larger peak luminance value at that position is selected. After that, the process advances to step S48. In step S48, the position at which the height has been detected, the height, and the peak luminance value are stored.

In step S49, it is determined whether or not scan on the measurement target (board S) has been completed. When the scan has been completed, the height information acquisition process is terminated. When the scan has not been completed, the positions of the imager 2 and the projector 201 are moved, the process returns to step S42, and the process operations in step S42 to step S49 are repeated.

The remaining configurations of the second embodiment are similar to those of the first embodiment.

Advantageous Effects of Second Embodiment

According to the second embodiment, as described above, the board inspection device 200 includes the controller 1 configured or programmed to acquire the measurement height with the higher luminance of the measurement light beam as the height information of the board S when the plurality of measurement heights are acquired for the same position due to reflected light noise caused by reflection of the measurement light beam from the board S corresponding to the measurement target. Accordingly, using the fact that the luminance when the measurement light beam is projected directly onto the board S is higher than the luminance of the reflected light noise, the board S can be accurately measured by eliminating the measurement height due to the reflected light noise from the plurality of measurement heights. Furthermore, unlike a case in which imaging is performed while the imager 2 is moved in the optical axis direction, it is not necessary to perform imaging while the imager 2 is moved in the optical axis direction at one position, and thus an increase in the imaging time at one position can be reduced or prevented. Consequently, the board S corresponding to the measurement target can be accurately measured by removing the reflected light noise caused by reflection of the measurement light beam while an increase in the time required to measure the board S corresponding to the measurement target is reduced or prevented.

According to the second embodiment, as described above, the controller 1 is configured or programmed to acquire the height of the board S for all the measurement light beams imaged by the imager 2, including the reflected light noise, and acquire the measurement height with the higher luminance of the measurement light beam as the height information of the board S when the plurality of measurement heights are acquired for the same position. Accordingly, the occurrence of a position on the board S at which the measurement height cannot be acquired can be reduced or prevented, and thus interpolation by predicting the position at which the measurement height cannot be acquired from the surrounding heights can be reduced or prevented. Consequently, the board S can be accurately measured.

MODIFIED EXAMPLES

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which two projectors are provided on the first side with respect to the imager, and two projectors are provided on the second side has been shown in the aforementioned first embodiment, the present disclosure is not restricted to this. In the present disclosure, two projectors may be provided on only one side with respect to the imager. Alternatively, three or more projectors may be provided on the same side with respect to the imager.

While the example in which one projector is provided has been shown in the aforementioned second embodiment, the present disclosure is not restricted to this. In the present disclosure, a plurality of projectors may be provided in the configuration of the second embodiment.

While the example in which the measurement device (measurement unit) of the present disclosure is provided in the board inspection device that inspects the board has been shown in each of the aforementioned first and second embodiments, the present disclosure is not restricted to this. The measurement device (measurement unit) of the present disclosure may be provided in a device other than the board inspection device. For example, the measurement device (measurement unit) of the present disclosure may be provided in a printer that prints solder on a board, a component mounting device that mounts electronic components on a board, a foreign matter inspection device, or the like. Alternatively, the measurement device (measurement unit) of the present disclosure may be provided in a three-dimensional measurement apparatus that measures the three-dimensional shape of a measurement target.

While the example in which the position based on the second measurement light beam is corrected by expanding or contracting the image of the second measurement light beam such that the position based on the second measurement light beam corresponds to the position based on the first measurement light beam has been shown in the aforementioned first embodiment, the present disclosure is not restricted to this. In the prevent disclosure, the position based on the first measurement light beam may be corrected by expanding or contracting the image of the first measurement light beam such that the position based on the first measurement light beam corresponds to the position based on the second measurement light beam. Alternatively, both the position based on the first measurement light beam and the position based on the second measurement light beam may be corrected by expanding or contracting the image of the first measurement light beam and the image of the second measurement light beam such that the position based on the first measurement light beam and the position based on the second measurement light beam corresponds to each other.

While the example in which the position based on the second measurement light beam is shifted and corrected to correspond to the position based on the first measurement light beam has been shown in the aforementioned first embodiment, the present disclosure is not restricted to this. In the present disclosure, the position based on the first measurement light beam may be shifted and corrected to correspond to the position based on the second measurement light beam. Alternatively, both the position based on the first measurement light beam and the position based on the second measurement light beam may be shifted and corrected to correspond to each other.

While the example in which the positions based on the third measurement light beam and the fourth measurement light beam are reversed and corrected to correspond to the position based on the first measurement light beam has been shown in the aforementioned first embodiment, the present disclosure is not restricted to this. In the present disclosure, the positions based on the third measurement light beam and the fourth measurement light beam may be reversed and corrected to correspond to the position based on the second measurement light beam. Alternatively, the position based on the first measurement light beam may be reversed and corrected to correspond to the positions based on the third measurement light beam and the fourth measurement light beam. Alternatively, the position based on the second measurement light beam may be reversed and corrected to correspond to the positions based on the third measurement light beam and the fourth measurement light beam.

While the example in which the reference positions of the measurement light beams are set using a jig has been shown in the aforementioned first embodiment, the present disclosure is not restricted to this. In the present disclosure, the reference positions of the measurement light beams may be set using a known flat position on the device without using a jig, for example.

While the control process operations performed by the controller are described, using the flows described in a manner driven by a flow in which processes are performed in order along a process flow for the convenience of illustration in each of the aforementioned first and second embodiments, the present disclosure is not restricted to this. In the present disclosure, the process operations performed by the controller may be performed in an event-driven manner in which processes are performed on an event basis. In this case, the process operations may be performed in a complete event-driven manner or in a combination of an event-driven manner and a manner driven by a flow.

What is claimed is:

1. A measurement device comprising:
   an imager to image a measurement target;
   a first projector on a first side with respect to the imager to project a linear first measurement light beam onto the measurement target from a direction inclined at a first angle with respect to a horizontal direction;
   a second projector on the first side with respect to the imager to project a linear second measurement light beam onto the measurement target from a direction inclined at a second angle different from the first angle with respect to the horizontal direction; and
   a controller configured or programmed to remove reflected light noise based on the first measurement light beam and the second measurement light beam projected onto the measurement target and imaged by the imager and acquire height information of the measurement target.

2. The measurement device according to claim 1, wherein the imager, the first projector, and the second projector are operable to project and image measurement light beams while moving relative to the measurement target.

3. The measurement device according to claim 1, wherein the controller is configured or programmed to remove, as the reflected light noise, measurement light beams at positions at which a position based on the first measurement light beam and a position based on the second measurement light beam do not overlap each other.

4. The measurement device according to claim 3, wherein the controller is configured or programmed to correct the position based on the second measurement light beam by expanding or contracting a captured image such that the position based on the second measurement light beam corresponds to the position based on the first measurement light beam, based on a projection angle of the first projector and a projection angle of the second projector.

5. The measurement device according to claim 3, wherein the controller is configured or programmed to shift and correct, based on the first measurement light beam and the second measurement light beam projected onto a reference height position, the position based on the second measurement light beam such that the position based on the second measurement light beam corresponds to the position based on the first measurement light beam.

6. The measurement device according to claim 1, further comprising:
   a third projector on a second side opposite to the first side with respect to the imager to project a third measurement light beam onto the measurement target from a direction inclined at a third angle with respect to the horizontal direction; and
   a fourth projector on the second side with respect to the imager to project a fourth measurement light beam onto the measurement target from a direction inclined at a fourth angle different from the third angle with respect to the horizontal direction; wherein
   the controller is configured or programmed to remove the reflected light noise based on the first measurement light beam, the second measurement light beam, the third measurement light beam, and the fourth measurement light beam projected onto the measurement target and imaged by the imager, and acquire the height information of the measurement target.

7. The measurement device according to claim 6, wherein the controller is configured or programmed to acquire a plurality of measurement heights based on the first measurement light beam, the second measurement light beam, the third measurement light beam, and the fourth measurement light beam projected onto the measurement target and imaged by the imager, and compare the acquired plurality of measurement heights to acquire one piece of height information of the measurement target.

8. The measurement device according to claim 6, wherein the controller is configured or programmed to reverse and correct positions based on the third measurement light beam and the fourth measurement light beam such that the positions based on the third measurement light beam and the fourth measurement light beam correspond to a position based on the first measurement light beam.

9. A board inspection device comprising:
   a board holder to hold a board on which an electronic component has been mounted; and
   a measurement unit to measure the board held by the board holder; wherein
   the measurement unit includes:
      an imager to image the board;
      a first projector on a first side with respect to the imager to project a linear first measurement light beam onto the board from a direction inclined at a first angle with respect to a horizontal direction;
      a second projector on the first side with respect to the imager to project a linear second measurement light beam onto the board from a direction inclined at a second angle different from the first angle with respect to the horizontal direction; and
      a controller configured or programmed to remove reflected light noise based on the first measurement light beam and the second measurement light beam projected onto the board and imaged by the imager and acquire height information of the board.

10. The measurement device according to claim 2, wherein the controller is configured or programmed to remove, as the reflected light noise, measurement light beams at positions at which a position based on the first measurement light beam and a position based on the second measurement light beam do not overlap each other.

11. The measurement device according to claim 10, wherein the controller is configured or programmed to correct the position based on the second measurement light beam by expanding or contracting a captured image such that the position based on the second measurement light beam corresponds to the position based on the first measurement light beam, based on a projection angle of the first projector and a projection angle of the second projector.

12. The measurement device according to claim 4, wherein the controller is configured or programmed to shift and correct, based on the first measurement light beam and the second measurement light beam projected onto a reference height position, the position based on the second measurement light beam such that the position based on the second measurement light beam corresponds to the position based on the first measurement light beam.

13. The measurement device according to claim 2, further comprising:
   a third projector on a second side opposite to the first side with respect to the imager to project a third measurement light beam onto the measurement target from a direction inclined at a third angle with respect to the horizontal direction; and
   a fourth projector on the second side with respect to the imager to project a fourth measurement light beam onto the measurement target from a direction inclined at a fourth angle different from the third angle with respect to the horizontal direction; wherein
   the controller is configured or programmed to remove the reflected light noise based on the first measurement light beam, the second measurement light beam, the third measurement light beam, and the fourth measurement light beam projected onto the measurement target and imaged by the imager, and acquire the height information of the measurement target.

14. The measurement device according to claim 3, further comprising:
   a third projector on a second side opposite to the first side with respect to the imager to project a third measurement light beam onto the measurement target from a direction inclined at a third angle with respect to the horizontal direction; and
   a fourth projector on the second side with respect to the imager to project a fourth measurement light beam onto the measurement target from a direction inclined at a fourth angle different from the third angle with respect to the horizontal direction; wherein
   the controller is configured or programmed to remove the reflected light noise based on the first measurement light beam, the second measurement light beam, the third measurement light beam, and the fourth measurement light beam projected onto the measurement target and imaged by the imager, and acquire the height information of the measurement target.

15. The measurement device according to claim 4, further comprising:
   a third projector on a second side opposite to the first side with respect to the imager to project a third measurement light beam onto the measurement target from a direction inclined at a third angle with respect to the horizontal direction; and a fourth projector on the second side with respect to the imager to project a fourth measurement light beam onto the measurement target from a direction inclined at a fourth angle different from the third angle with respect to the horizontal direction; wherein the controller is configured or programmed to remove the reflected light noise based on the first measurement light beam, the second measurement light beam, the third measurement light beam, and the fourth measurement light beam projected onto the measurement target and imaged by the imager, and acquire the height information of the measurement target.

16. The measurement device according to claim 5, further comprising:

a third projector on a second side opposite to the first side with respect to the imager to project a third measurement light beam onto the measurement target from a direction inclined at a third angle with respect to the horizontal direction; and a fourth projector on the second side with respect to the imager to project a fourth measurement light beam onto the measurement target from a direction inclined at a fourth angle different from the third angle with respect to the horizontal direction; wherein the controller is configured or programmed to remove the reflected light noise based on the first measurement light beam, the second measurement light beam, the third measurement light beam, and the fourth measurement light beam projected onto the measurement target and imaged by the imager, and acquire the height information of the measurement target.

17. The measurement device according to claim 7, wherein the controller is configured or programmed to reverse and correct positions based on the third measurement light beam and the fourth measurement light beam such that the positions based on the third measurement light beam and the fourth measurement light beam correspond to a position based on the first measurement light beam.

* * * * *